US011288032B2

(12) United States Patent
Goto et al.

(10) Patent No.: US 11,288,032 B2
(45) Date of Patent: Mar. 29, 2022

(54) PLATFORM FOR CONTROL IN SYNCHRONIZATION WITH MUSIC AND CONTROL METHOD THEREFOR

(71) Applicant: National Institute of Advanced Industrial Science and Technology, Tokyo (JP)

(72) Inventors: Masataka Goto, Tsukuba (JP); Takahiro Inoue, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 276 days.

(21) Appl. No.: 16/634,270

(22) PCT Filed: Jul. 30, 2018

(86) PCT No.: PCT/JP2018/028398
§ 371 (c)(1),
(2) Date: Feb. 19, 2020

(87) PCT Pub. No.: WO2019/022256
PCT Pub. Date: Jan. 31, 2019

(65) Prior Publication Data
US 2021/0064331 A1 Mar. 4, 2021

(30) Foreign Application Priority Data

Jul. 28, 2017 (JP) .............................. JP2017-147233

(51) Int. Cl.
*G06F 3/16* (2006.01)
*G06F 13/362* (2006.01)
(52) U.S. Cl.
CPC ............ *G06F 3/165* (2013.01); *G06F 13/362* (2013.01)

(58) Field of Classification Search
CPC ............................... G06F 3/165; G06F 13/362
See application file for complete search history.

(56) References Cited

U.S. PATENT DOCUMENTS 9,813,829 B2 * 11/2017 Sheen ................ H04N 21/8113
2003/0126211 A1 7/2003 Anttila et al.
(Continued)

FOREIGN PATENT DOCUMENTS

| JP | 2011-228784 | 11/2011 |
| JP | 2017-103547 | 6/2017 |

OTHER PUBLICATIONS

International Search Report, dated Oct. 16, 2018 (Oct. 16, 2018), 1 page.

*Primary Examiner* — Joseph Saunders, Jr.
(74) *Attorney, Agent, or Firm* — Rankin, Hill & Clark LLP

(57) ABSTRACT

A music-synchronized control platform to synchronize music playback or music-synchronized performance or both with music in a plurality of devices. A master control section of at least one music-synchronized control master controls a master music playback player or master music-synchronized performer by converting a timing in the reference clock time corresponding to an in-content playback timing, which is obtained from the status of a virtual music playback player, to a timing in the individual clock time corresponding to the in-content playback timing. The slave control section of each of the plurality of music-synchronized control slaves control a slave music playback player or a slave music-synchronized performer and by converting a timing in the reference clock time corresponding to the in-content playback timing, which is obtained from the status of the virtual music playback player, to a timing in the individual clock time corresponding to the in-content playback timing.

18 Claims, 20 Drawing Sheets

(56) References Cited

U.S. PATENT DOCUMENTS

| | | | |
|---|---|---|---|
| 2007/0039449 A1* | 2/2007 | Redmann | G10H 1/0058 |
| | | | 84/609 |
| 2008/0045140 A1* | 2/2008 | Korhonen | H04M 1/72412 |
| | | | 455/3.06 |
| 2013/0103770 A1 | 4/2013 | Kamolz et al. | |
| 2015/0172843 A1* | 6/2015 | Quan | H04S 7/30 |
| | | | 381/18 |
| 2016/0307552 A1* | 10/2016 | Gottlieb | G10H 1/0058 |
| 2017/0273044 A1* | 9/2017 | Alsina | H04L 67/104 |

* cited by examiner

PLATFORM FOR CONTROL IN SYNCHRONIZATION WITH MUSIC AND CONTROL METHOD THEREFOR

TECHNICAL FIELD

The present invention relates to a music-synchronized control platform configured to synchronize music playback or music-synchronized performance or both with music and to a control method therefor.

BACKGROUND ART

Music itself is enjoyed, and music is also frequently enjoyed together with various performances in synchronization with the music. In a music video, for example, images are synchronized with the music. In recent years, it has become possible to change display images on the screen of a personal computer or to enable a robot to dance in synchronization with the music. In a live concert, a dedicated system is employed to change colors of a number of penlights at one time. Another example is a system capable of enabling a dedicated application in a smartphone to emit a light of single color. Since dedicated systems for individual performances have been developed so far, expandability and scalability are still poor.

JP 2017-103547 A (Patent Document 1) discloses a technique for suppressing a time difference in playback timing to play back music contents in a plurality of playback devices according to an external command after judging whether the playback devices are working as a master or a slave.

JP 2011-228784 A (Patent Document 2) discloses an invention for enabling synchronized viewing of the same image among a plurality of devices which are grouped into master and slave terminals.

RELATED ART

Patent Documents

Patent Document 1: JP 2017-103547 A
Patent Document 2: JP 2011-228784 A

SUMMARY OF INVENTION

Technical Problem

It has been impossible so far to enjoy music performances in synchronization with a variety of musical pieces while freely combining diversified types of off-the-shelf portable terminals (e.g. smartphones, tablets, etc.), personal computers and IOT (Internet of Things) devices (Internet-connected robots and lighting equipment, etc.). When attempting to synchronously control the music playback and performance using a lot of diversified types of off-the-shelf general-purpose devices, not dedicated devices, there are technical problems under a communication environment intermittently repeating individual asynchronous communications and a diversified implementation environment. The performances, which require continuous playback of the music and synchronization with the music, are likely to be out of alignment (synchronization) among the devices. Up to date, it has not been feasible for the users to conveniently combine different performances or to change the performances. In addition, there has been no development kit that enables programmers (engineers having programming skill) to readily develop a large-scaled music-synchronized novel performance.

An object of the invention is to provide a music-synchronized control platform configured to synchronize music playback or music-synchronized performance or both with music and to a control method therefor.

Solution to Problems

A music-synchronized control platform of the present invention configured to synchronize music playback or music-synchronized performance or both with music in a plurality of devices comprises at least one music-synchronized control master, a plurality of music-synchronized control slaves, and a music-synchronized control server.

The at least one music-synchronized control master includes a master music playback player and a master processor including an individual clock time generator that generates an individual clock time, a communication means, and a master control section for the master music playback player, and is configured to control the master music playback player so as to play back a music content chosen from a plurality of music contents.

A plurality of music-synchronized control slaves each includes a slave music playback player or a slave music-synchronized performer or both, and a slave processor including an individual clock time generator that generates an individual clock time, a communication means, and a slave control section for the slave music playback player or the slave music-synchronized performer or both, and is configured to control the slave music playback player or the slave music-synchronized performer or both.

The music-synchronized control server includes a server processor including a reference clock time generator that generates a reference clock time, and a communication means connected to the at least one music-synchronized control master and the plurality of music-synchronized control slaves via a communication network. The server processor is configured to execute the following processes. First, the server processor creates a stage and a virtual music playback player when a stage create command is input from the at least one music-synchronized control master. The server processor deletes the virtual music playback player and the stage when a stage delete command is input from the at least one music-synchronized control master. The server processor updates a status of the virtual music playback player when an operation command relating to playback of the music content is input from the at least one music-synchronized control master. The server processor responds with a status of the virtual music playback player, when a polling command for the status of the virtual music playback player is input from the at least one music-synchronized control master or the plurality of music-synchronized control slaves, to the music-synchronized control master or music-synchronized control slave that has transmitted the polling command. And, the server processor transmits, upon receipt of a synchronization request command, a reference clock time at the time that the synchronization request command is input from the at least one music-synchronized control master or the plurality of music-synchronized control slaves, to the music-synchronized control master or music-synchronized control slave that has transmitted the synchronization request command that requests synchronization of the reference clock time and the individual clock time.

The status of the virtual music playback player includes at least an identifier (e.g. an URL) that identifies a music content to be played back in the at least one music-synchronized control master, a most recent operation content as specified by the most recently issued operation command, an in-content playback timing of the music content associated with the operation command (an elapse time from the beginning of the content, assuming that the time at the beginning of the content is 0 second at the playback position in the music content), and a timing in the reference clock time corresponding to the in-content playback timing in the reference clock time. A typical identifier identifying the music content is an URL, and a typically URL is a URL of the contents containing videos such as YouTube (a registered trademark), and a URL of music contents such as MP3.

The master control section of the at least one music-synchronized control master has a function of controlling the master music playback player by converting a timing in the reference clock time corresponding to the in-content playback timing, which is obtained from the status of the virtual music playback player, to a timing in the individual clock time corresponding to the in-content playback timing; and the slave control section of each of the plurality of music-synchronized control slaves has a function of controlling the slave music playback player or the slave music-synchronized performer or both by converting a timing in the reference clock time corresponding to the in-content playback timing, which is obtained from the status of the virtual music playback player, to a timing in the individual clock time corresponding to the in-content playback timing.

In the present invention, the control server updates the status of the virtual music playback player on a basis of an operation command associated with the music content that has been input from the at least one music-synchronized control master when the operation command is input. Then, the at least one music-synchronized control master and the plurality of music-synchronized control slaves are enabled to acquire a current status of the virtual music playback player. Then, when a polling command for the status of the virtual music playback player is input from the at least one music-synchronized control master or the plurality of music-synchronized control slaves, the control server responds with the most recent status of the virtual music playback player to that music-synchronized control master or music-synchronized control slave that has transmitted the polling command. The master control section of the at least one music-synchronized control master that has received the recent status of the virtual music playback player converts the in-content playback timing, which is obtained from the status of the virtual music playback player, to the timing in the individual clock time corresponding to the in-content playback timing. The master music playback player is thus controlled to play back the music content as identified by the identifier provided by the control server. The slave control section of the music-synchronized control slave that has received the recent status of the virtual music playback player converts the in-content playback timing, which is obtained from the status of the virtual music playback player, to the timing in the individual clock time corresponding to the in-content playback timing. The slave music playback player or the slave music-synchronized performer or both are thus controlled to play back the music content as identified by the identifier provided by the control server, or to make performance in synchronization with the playback of the music content.

According to the present invention, as described above, even when the timing in the individual clock time of the at least one music-synchronized control master and those of the plurality of music-synchronized control slaves do not align (synchronize) with the reference clock time of the control server, the playback of the same music content is enabled substantially in synchronization in the at least one music-synchronized control master and the plurality of music-synchronized control slaves by being based on the status of the virtual music playback player in the music-synchronized control server. In addition, in the music-synchronized control slaves, the music-synchronized performers are enabled to work in synchronization with the music playback. The at least one music-synchronized control master may include a music-synchronized performer. In these configurations, the music content and an analysis result of a musical piece in the music content may be acquired on a basis of the identifier. It is possible to cause only the music-synchronized performers to perform without the music playback on a basis of the analysis result of the musical piece (the musical piece analysis result).

Preferably, the master control section of the at least one music-synchronized control master has a function of acquiring an actual in-content playback timing at which the master music playback player is currently playing back the music content (an elapse time from the beginning of the content, assuming that the time at the beginning of the content is 0 second at the playback position in the music content), calculating a time difference between the actual in-content playback timing and an computationally defined ideal in-content playback timing at which the master music playback player has to be playing back the music content in the individual clock time, and controlling, only when the time difference is equal to or longer than a certain time, playback of the master music playback player so as to play back at the computationally defined ideal in-content playback timing in the individual clock time to minimize the time difference. With this, even if a jitter or delay occurs for some reason, the time difference can be adjusted.

The slave control section of each of the plurality of music-synchronized control slaves is provided with the slave music playback player. Preferably the slave control section has a function of acquiring an actual in-content playback timing at which the slave music playback player is currently playing back the music content (an elapse time from the beginning of the content, assuming that the time at the beginning of the content is 0 second at the playback position in the music content), calculating a time difference between the actual in-content playback timing and an computationally defined ideal in-content playback timing at which the slave music playback player has to be playing back the music content in the individual clock time, and controlling, only when the time difference is equal to or longer than a certain time, playback of the slave music playback player so as to play back at the computationally defined ideal in-content playback timing in the individual clock time to minimize the time difference. With this, even if a jitter or delay occurs for some reason, the time difference can be adjusted.

The stage preferably has a function of issuing a secret key and an access key to the music-synchronized control master. Here, the at least one music-synchronized control master uses the secret key and the access key to communicate with the stage of the music-synchronized control server; and the plurality of music-synchronized control slaves use the access key, which has been issued to the music-synchronized control master, to communicate with the stage of the music-synchronized control server. The secret key authorizes only the at least one music-synchronized control master to change the status of the virtual music playback player. The user using the at least one music-synchronized control master may notify the access key to other users using the music-synchronized control slave via social media, email, etc. The music-synchronized control slaves may be notified of the access key via the QR Code (a registered trademark), URL, etc.

The music-synchronized control server identifies the stage and the virtual music playback player with the access key upon access from the at least one music-synchronized control master or the plurality of music-synchronized control slaves. Thus, even when a plurality of music-synchronized control masters that play back different music contents are connected to the music-synchronized control server, the at least one music-synchronized control master and the polarity of music-synchronized control slaves can be respectively connected to a correct stage and a virtual music playback player.

The stage has a function of allocating an ID to each of the at least one music-synchronized control master and the plurality of music-synchronized control slaves that respectively have accessed the stage for the first time. Further, the stage further has a function of managing a connection status of each of the at least one music-synchronized control master and the plurality of music-synchronized control slaves on a basis of the ID and an access timestamp. With the management using the ID and the access timestamp, it is possible to prevent the number of the music-synchronized control masters and slaves more than the predetermined number from being connected to the music-synchronized control server. In addition, it is possible to define the music-synchronized control masters and slaves that have already been disconnected from the music-synchronized control server as being out of management.

The most recent operation content recorded as the status of the virtual music playback player includes at least the playback and stop of the music content. Specifically, when the operation command is a playback command, a playback status is recorded as the most recent operation content, and the in-content playback timing is recorded as a playback start time; and when the operation command is a stop command, a stop status is recorded as the most recent operation content, and the in-content playback timing is recorded as a playback stop time. Further, the most recent operation content may include a seek status when the playback is on-going or stopped. In this case, the most recent operation content recorded as the status of the virtual music playback player includes on-going and stopped seeks. When the operation command is a seek command, an on-going seek or a stopped seek is recorded as the most recent operation content, and the in-content playback timing is recorded as a timing at a seek position.

The at least one music-synchronized control master may be a communication terminal including a display section provided with a display screen; and is configured to display an input interface of the music playback player on the display screen. With this, the user of the at least one music-synchronized control master can change the most recent operation content using an input interface. This change, in turn, updates the status of the virtual music playback player, and the plurality of music-synchronized control slaves are accordingly caused to perform the playback according to the change.

The master control section of the at least one music-synchronized control master and the slave control section of each of the plurality of music-synchronized control slaves have a function of periodically transmitting the polling command to the music-synchronized control server to check the status of the virtual music playback player, and respectively controlling the master music playback player and the slave music playback player or the slave music-synchronized performer according to a change in the status of the virtual music playback player upon detection of the change in the status transmitted back from the music-synchronized control server. As a result, it becomes possible to always perform the playback operation in the master and slave music playback players in the same status as the virtual music playback player, and to perform synchronized operation in the music-synchronized performers. The music-synchronized control slave can be connected to the stage in the middle of the operation. Accordingly, the specified number of music-synchronized control slaves to be connected can readily be increased.

The master control section of the at least one music-synchronized control master and the slave control section of each of the plurality of music-synchronized control slaves preferably have a function of acquiring an analysis result of a musical piece corresponding to the music content whereby the analysis result includes at least one event, judging whether or not the in-content playback timings in the master music playback player and the slave music playback player become matched with the event timing of any event while the master music playback player and the slave music playback player are playing back, and accordingly executing an event process corresponding to the event having the matched event timing. With this, the events can be performed in synchronization with the music. As a result, the music-synchronized control master and slaves can autonomously perform the event process of the event independently of each other. This does not increase the workload of the music-synchronized control server in connection with the performance of the event process. Even if the network connection is intermittent, the event process can continuously be performed.

The slave music-synchronized performer of each of the plurality of music-synchronized control slaves is controlled according to the musical piece analysis result by executing an event process. Thus, music-synchronized performances can be attained.

Preferably, the at least one music-synchronized control master and the plurality of music-synchronized control slaves each have a function of specifying an event process corresponding to at least one event according to the analysis result of the musical piece included in the music content. With this, the user or programmer can freely specify the event process corresponding to the event. In addition, diversified performances can be synchronized with the music and a variety of devices can be controlled.

The event is defined on a basis of a beat, a bar, a chorus section, a repeat section, or a chord included in the analysis result of the musical piece.

The at least one music-synchronized control master and the plurality of music-synchronized control slaves each record, as an offset time, a time difference between the individual clock time and the reference clock time of the music-synchronized control server as is obtained by issuing the synchronization request command. Preferably, they respectively have a function of adjusting the computationally defined ideal in-content playback timing in the master music playback player and the slave music playback player if the offset time has changed more largely than a predetermined value. With this, when the time difference becomes significantly large between the individual clock time and the reference clock time of the music-synchronized control server as is obtained by submitting the synchronization request command, synchronized operations can substantially completely be recovered.

Of course, only a single music-synchronized control master may be provided. In this configuration, namely, in the configuration where there is only a single music-synchronized control master, the single music-synchronized control master can be operated with "the status of the single music-synchronized control master" being always in alignment (synchronization) with "the status of the virtual music playback player". In this case, there is no need to synchronize the single music-synchronized control master with the virtual music playback player. Consequently, in this case, the single music-synchronized control master may be operated without controlling the master music playback player by converting a timing in the reference clock time corresponding to the in-content playback timing, which is obtained from the status of the virtual music playback player, to a timing in the individual clock time corresponding to the in-content playback timing.

In another aspect of the present invention, a method of controlling a music-synchronized control platform configured to synchronize music playback or music-synchronized performance or both with music. The configuration of the platform used herein is the same as the one described so far. In the method of controlling a music-synchronized control platform according to the present invention, the master control section of the at least one music-synchronized control master executes the step of controlling the master music playback player by converting a timing in the reference clock time corresponding to the in-content playback timing, which is obtained from the status of the virtual music playback player, to a timing in the individual clock time corresponding to the in-content playback timing. The slave control section of each of the plurality of music-synchronized control slaves executes of the step of controlling the slave music playback player or the slave music-synchronized performer or both by converting a timing in the reference clock time corresponding to the in-content playback timing, which is obtained from the status of the virtual music playback player, to a timing in the individual clock time corresponding to the in-content playback timing.

DESCRIPTION OF EMBODIMENT

Figure 1:
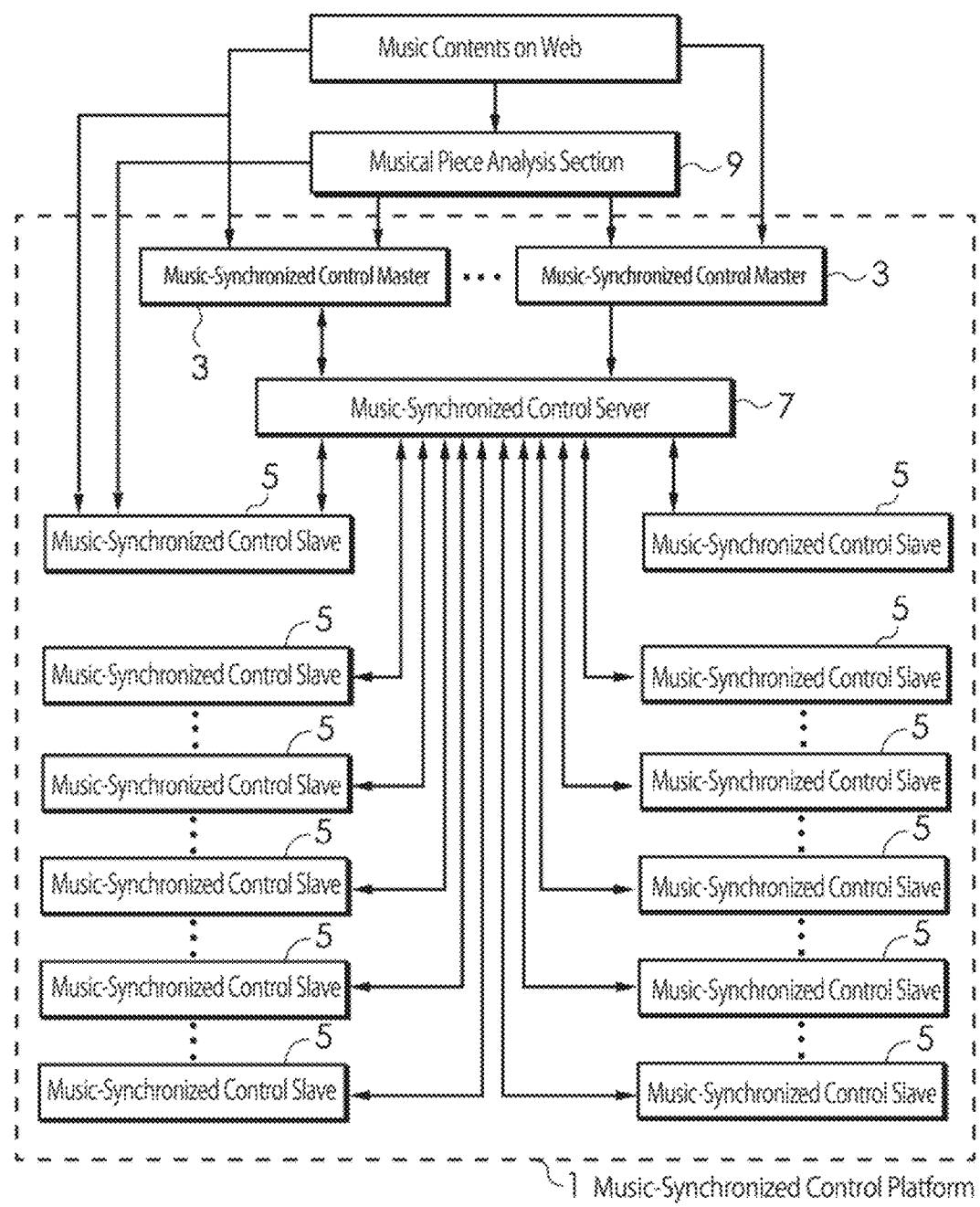
FIG. 1 is a block diagram illustrating a configuration of a music-synchronized control platform according to an embodiment of the present invention.

Now, an example music-synchronized control platform (a platform for control in synchronization with music) according an embodiment of the present invention will be described below in detail with reference to the accompanying drawings. FIG. 1 is a block diagram illustrating a configuration of a music-synchronized control platform according to an embodiment of the present invention. The music-synchronized control platform is configured to control a plurality of devices in synchronization with music. The music-synchronized control platform 1 comprises at least on music-synchronized control master 3, a plurality of music-synchronized control slaves 5, and a music-synchronized control server 7.

[Configuration of Music-Synchronized Control Master 3]

Figure 2:
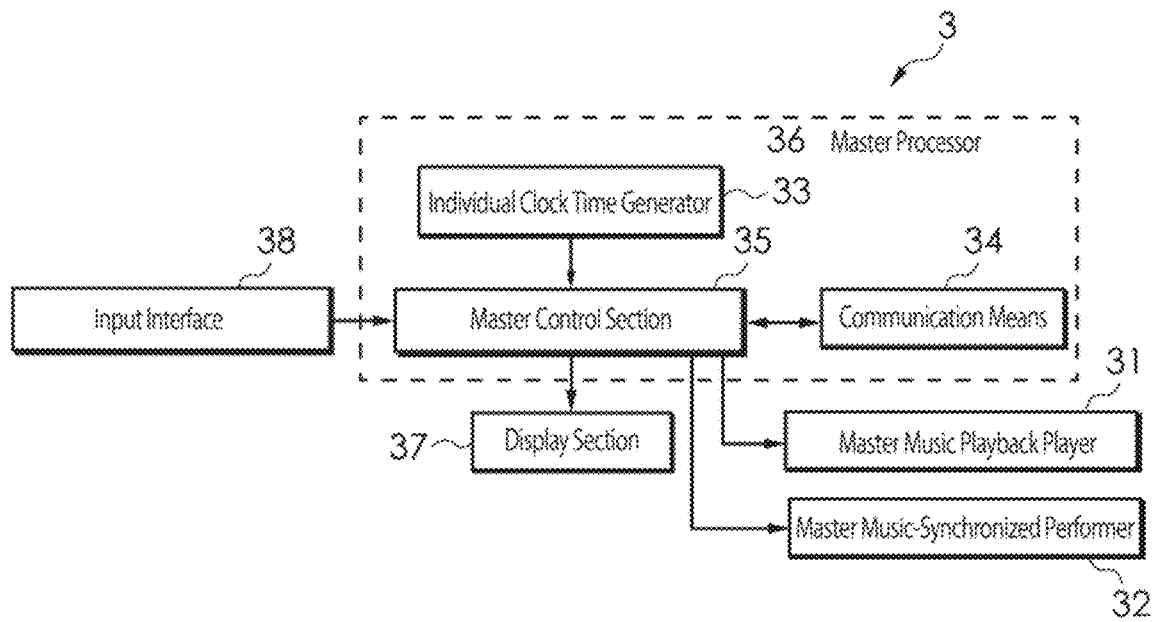
FIG. 2 is a block diagram illustrating a configuration of a music-synchronized control master according to the embodiment of the present invention.

As illustrated in FIG. 2, at least one music-synchronized control master 3 includes a master music playback player 31, a master music-synchronized performer 32, a master processor 36 including an individual clock time generator 33 that generates an individual clock time, a communication means 34, and a master control section 35 for the master music playback player 31, a display section 37 like a liquid crystal display, and input interface 38. At least one music-synchronized control master 3 controls the master music playback player 31 so as to play back a music content chosen from a plurality of music contents on the web, and controls the music-synchronized performer 32 constituted from liquid crystal display devices, light emitting devices such as LEDs, and mobile devices such as moving objects in synchronization with the music content. The term "synchronization with the music content" used herein includes synchronization with a musical piece analysis section 9. In the present embodiment, the at least one music-synchronized control master 3 may be a single music-synchronized control master. The music-synchronized performer 32 may not be provided. The master processor 36 may be implemented by a computer.

[Configuration of Music-Synchronized Control Slave 5]

Figure 3:
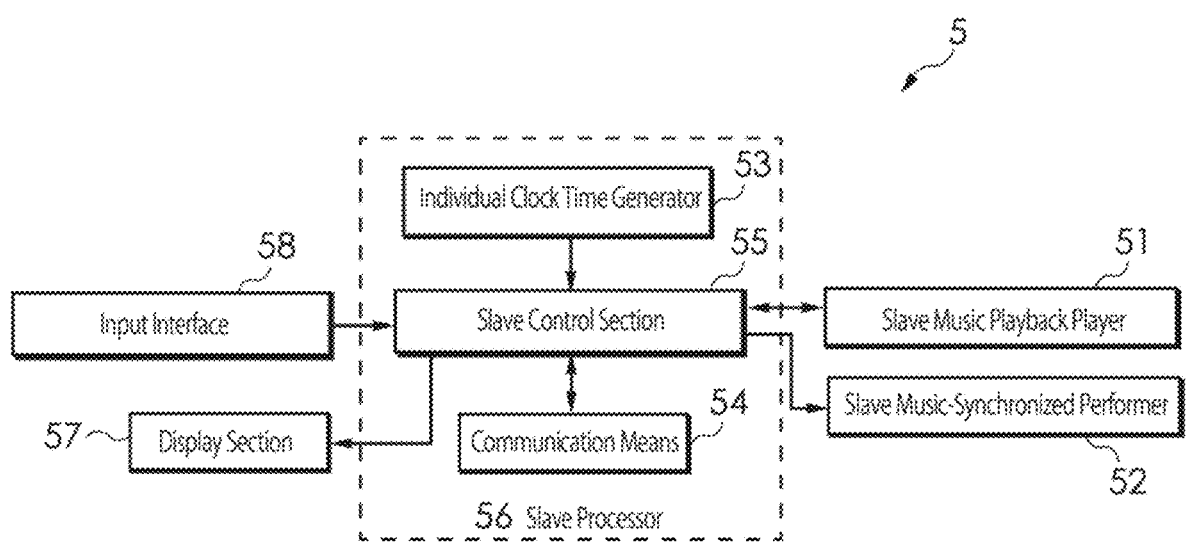
FIG. 3 is a block diagram illustrating a configuration of a music-synchronized control slave according to the embodiment of the present invention.

As illustrated in FIG. 3, a plurality of music-synchronized control slaves 5 each include a slave music playback player 51 and a music-synchronized performer 52, a slave processor 56 including an individual clock time generator 53 that generates an individual clock time, a communication means 54 and a slave control section for the slave music playback player or the music-synchronized performer or both, a display section 57 like a liquid crystal display, and an input interface 58. The music-synchronized control slave 5 controls the slave music playback player 51 and the slave music-synchronized performer 52. The music-synchronized control slave 5 may not necessarily include both of the slave music playback player 51 and the slave music-synchronized performer 52. At least one of the slave music playback player 51 and the slave music-synchronized performer 52 should be provided. The slave processor 56 may be implemented by a computer. By way of example, FIG. 1 illustrates that music contents on the web and an analysis result of a musical piece (a musical piece analysis result) are input only to one music-synchronized control slave 5. For simplified illustration, the input of the music contents on the web and the musical piece analysis result to other slaves is omitted.

[Configuration and Operations of Music-Synchronized Control Server 7]

Figure 4:
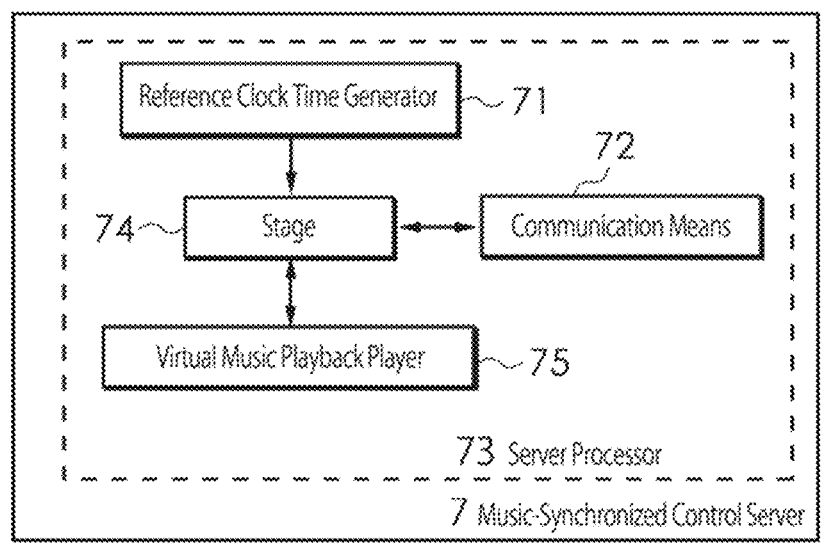
FIG. 4 is a block diagram illustrating a configuration of a music-synchronized control server according to the embodiment of the present invention.

As illustrated in FIG. 4, the music-synchronized control server 7 includes a server processor 73 including a reference clock time generator 71 and a communication means 72 that is connected to the at least one music-synchronized control master 3 and the plurality of music-synchronized control slaves 5 via a communication network. The server processor 73 constitutes a stage 74 and a virtual music playback player 75 for each music content to be played back upon receipt of a request from the music-synchronized control master 3. The server processor 73 works as described in the following sections. The server processor 73 may be implemented by a computer. The following sections refer to the algorithms illustrated in FIGS. 5 to 9.

Figure 5:
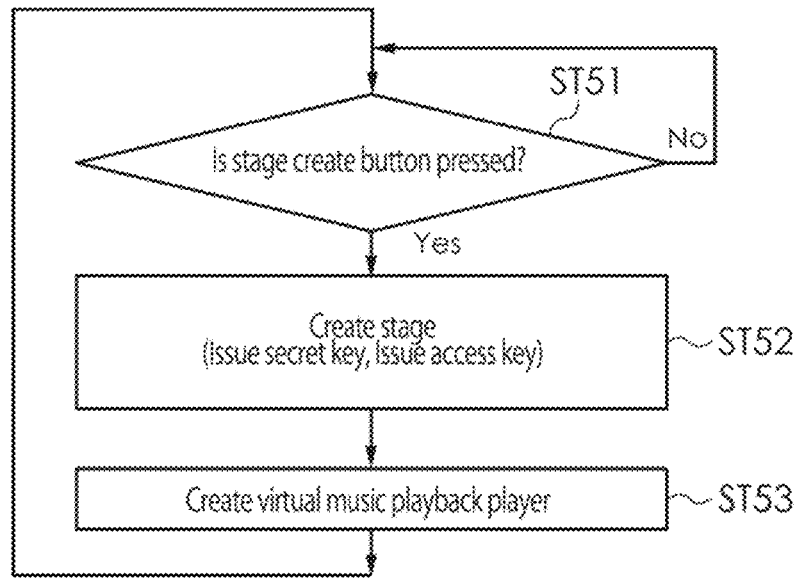
FIG. 5 is a flowchart illustrating an algorithm used in the music-synchronized control server.

When a stage create command is input from the at least one music-synchronized control master 3, the server processor 73 creates a stage 74 and also a virtual music playback player 75. The stage 74 in the music-synchronized control server 7 has a function of issuing a secret key and an access key to the at least one music-synchronized control master 3. In communication with the stage 74, the at least one music-synchronized control master 3 accesses the stage 74 using the secret key and the access key; and the plurality of music-synchronized control slaves 5 access the stage 74 using the access key that has been issued to the at least one music-synchronized control master 3. The secret key authorizes only the at least one music-synchronized control master 3 to change a status of the virtual music playback player 75. The user using the music-synchronized control master should notify the user using the music-synchronized control slave of the access key on a face-to-face basis or via social media and email (electronic mail). For example, the music-synchronized control slave 5 may be notified of the access key via a QR code or an URL. The flow of the process is illustrated in the algorithm of FIG. 5. At step ST51, it is judged whether or not a stage create command is input from the music-synchronized control master, specifically whether or not "the stage create button is pressed" is checked. If yes, the process goes to step ST52, and then a stage is create, and an access key and a secret key are issued. Following that, at step ST53, the virtual music playback player 75 is created.

Figure 6:
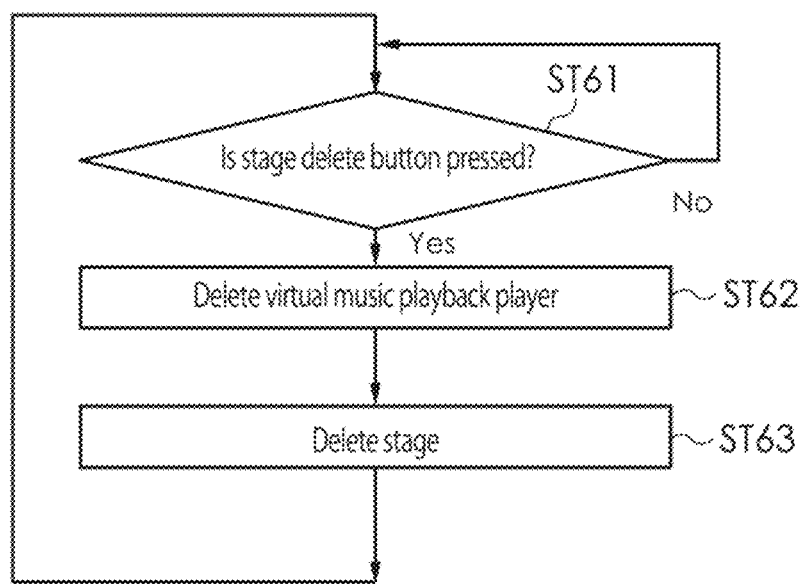
FIG. 6 is a flowchart illustrating an algorithm used in the music-synchronized control server.

As illustrated in the algorithm of FIG. 6, when a stage delete command is input from the at least one music-synchronized control master 3 (at step ST61, a question of "is stage delete button pressed?" is answered as yes), the virtual music playback player 75 is deleted and the stage 74 is also deleted (at steps ST62 and ST63).

Figure 7:
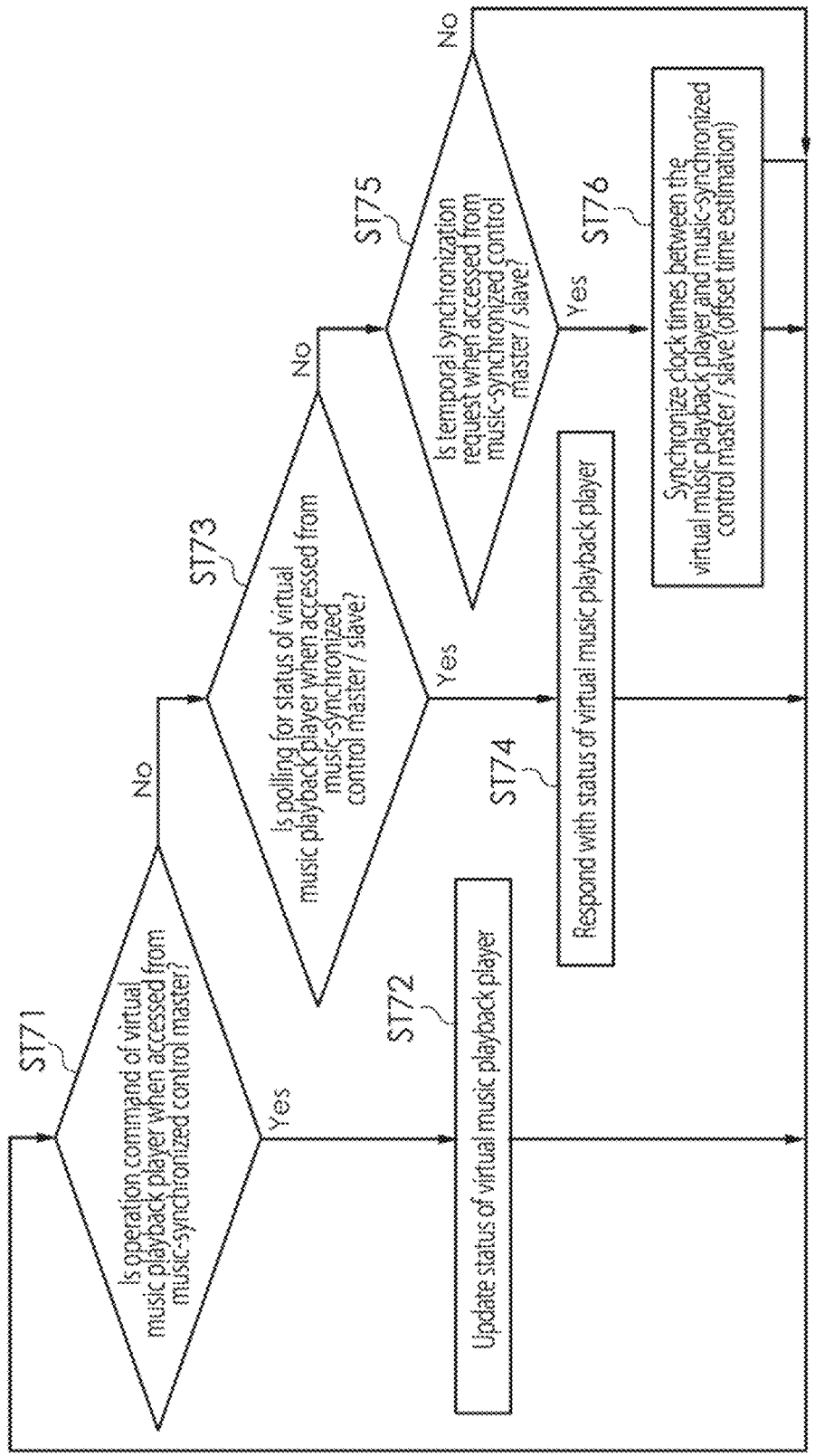
FIG. 7 is a flowchart illustrating an algorithm used in the music-synchronized control server.

As illustrated in the algorithm of FIG. 7, when an operation command relating to the playback of a music content is input from the at least one music-synchronized control master 3, a status of the virtual music playback player 75 is updated (at steps ST71 and ST72). The "operation command" includes those commands to change the instant status and those commands to change future statuses. When a polling command is input from the at least music-synchronized control master 3 or the plurality of music-synchronized control slaves 5 to check the status of the virtual music playback player 75, the stage 74 responds with the status of the virtual music playback player 75 to that music-synchronized control master 3 or slave 5 that has transmitted the polling command (at steps ST73 and ST74). Further, when a synchronization request command is input from the at least music-synchronized control master 3 or the plurality of music-synchronized control slaves 5 to request synchronization of an individual clock time with a reference clock time, the stage 74 responds with the current clock time to that music-synchronized control master 3 or slave 5 that has transmitted the synchronization request command (at steps ST75 and ST76). As described later in detail, the music-synchronized control master 3 or slave 5 that has received the reference clock time estimates an offset time and performs synchronization.

The term "the status of virtual music playback player" used here in respect of the virtual music playback player includes an identifier (for example, an URL) that identifies a music content to be played back in the at least one music-synchronized control master and the plurality of music-synchronized control slaves 5, the most recent operation content as is specified by the most recently issued operation command, the in-content playback timing at which the operation command works, and a timing in the reference clock time corresponding to the in-content playback timing. A typical identifier identifying the music content is an URL, and the typical URL is an URL of the contents containing a video such YouTube (a registered trademark), and a URL of music content such as MP3. In the present embodiment, the music-synchronized control platform 1 does not have functions of music download (or music online distribution) and musical piece upload, but plays the music streaming directly from an original website. Of course, the music-synchronized control platform 1 may have functions of generally available music download (or music online distribution) and musical piece upload.

In the present embodiments, the most recent operation content recorded as "the status of virtual music playback player" in the virtual music playback player 75 includes playback, stop, on-going seek, and stopped seek of the music contents. Specifically, when the operation command is a playback command, the playback status is recorded as the most recent operation content, and the in-content playback timing is recorded as the playback start time. When the operation command is a stop command, the stop status is recorded as the most recent operation content, and the in-content playback timing is recorded as the playback stop time. When the operation command is a seek command, the on-going seek or stopped seek status is recorded as the most recent operation content, and the in-content playback timing is recorded as a timing at the seek position. Of course, the operation command may not necessarily include a seek command.

Figure 8:
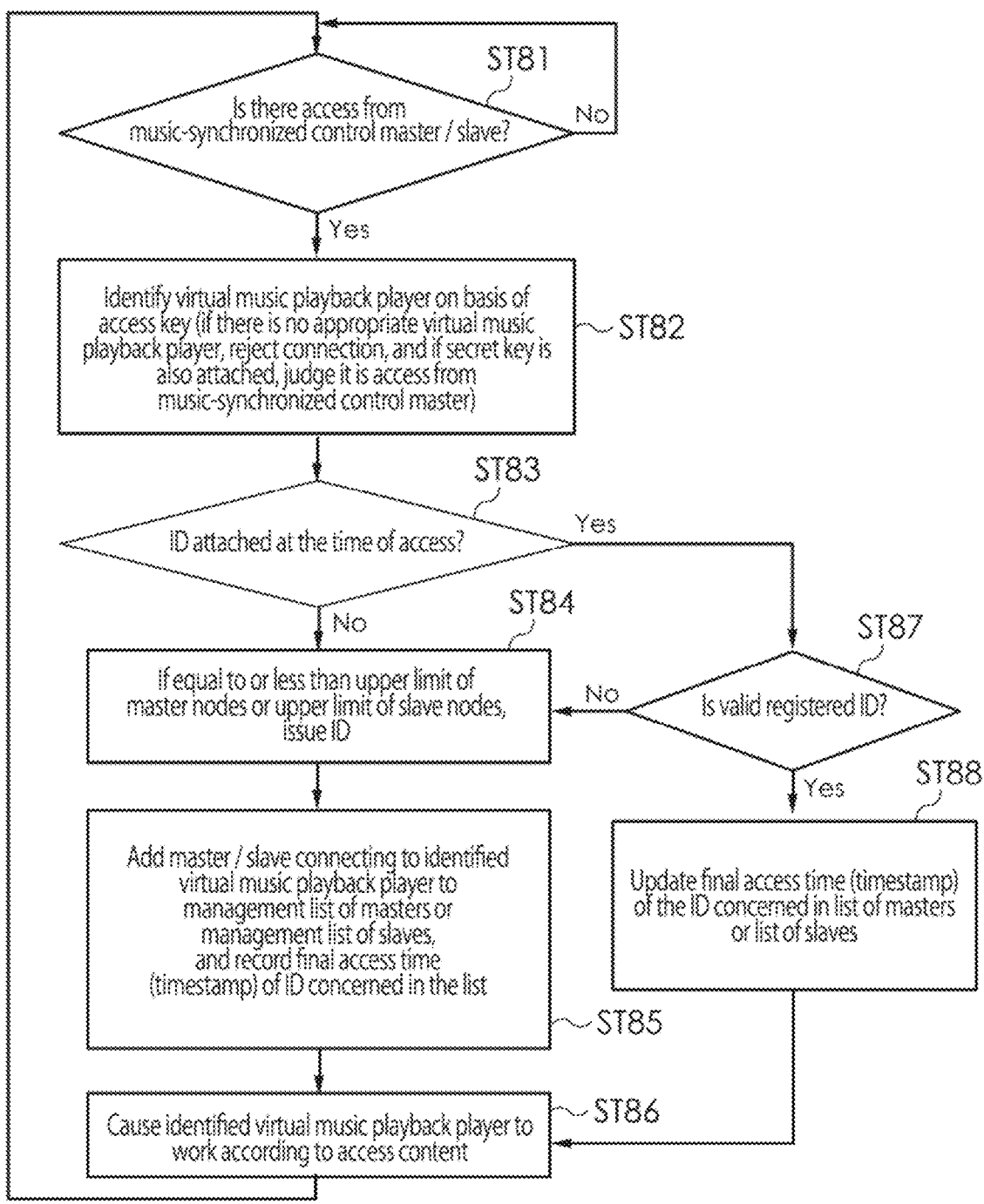
FIG. 8 is a flowchart illustrating an algorithm used in the music-synchronized control server.

As illustrated in an example algorithm of FIG. 8, only when the at least one music-synchronized control master and the plurality of music-synchronized control slaves that have accessed the stage 74 at step ST 81 have an access key, the stage 74 identifies the virtual music playback player on a basis of the access key, and then allows them to access the identified virtual music playback player. And, only when a secret key is used in the access, the stage 74 judges that the access has been made from the at least one music-synchronized control master 3. If there is no identified virtual music playback player, all of accesses are rejected (at step ST82). At step ST83, the stage 74 judges whether or not the identification number has already been allocated at the time of access. The stage 74 has a function of allocating an ID (identification) to each of the at least one music-synchronized control master 3 and the plurality of music-synchronized control slaves 5 that have accessed the stage 74 for the first time, provided that the upper limit number of the masters or the upper limit numbers of the slaves are not exceeded (at ST 84). When the upper limit number of the masters or the upper limit numbers of the slaves are exceeded, the ID (identification) is not issued and connection is rejected. The stage 74 further has a function of managing a connection status of each of the at least one music-synchronized control master 3 and the plurality of music-synchronized control slaves 5. Then, the stage 74 adds a new ID (identification) to a list of masters or a list of slaves that manages the at least one music-synchronized control master 3 and the plurality of music-synchronized control slaves 5 that are connecting to the identified virtual music playback player, and records the access time (timestamp) of that ID (identification) in the list (at step ST85). When an access is made from the music-synchronized control master or slave that has already an ID (identification), the stage 74 judges whether or not the identification ID is valid at step ST 87. If it is not valid, the stage 74 re-issues an ID at step ST84. If it is valid, the process goes to step ST88 where the stage 74 records the access time (timestamp) of that ID in the list of masters or slaves. Finally, the virtual music playback player 75 works according to what access has been made (at step ST86).

Figure 9:
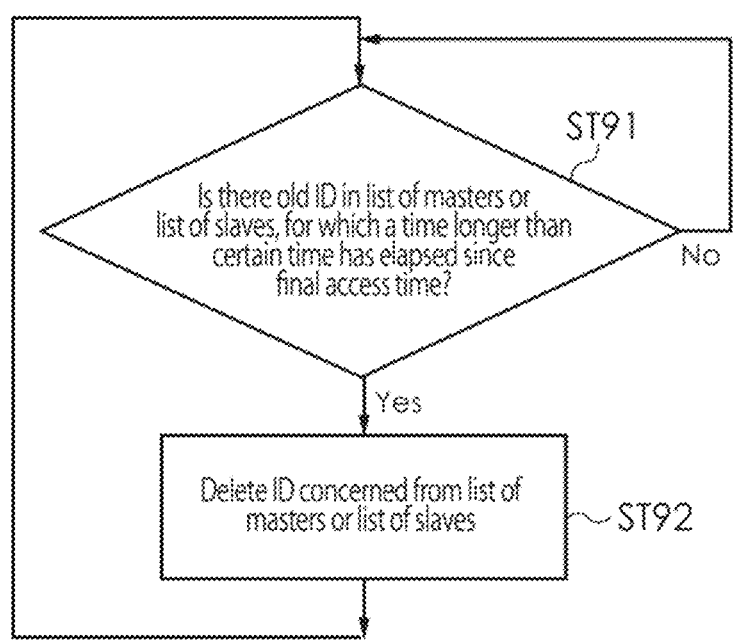
FIG. 9 is a flowchart illustrating an algorithm used in the music-synchronized control server.

In the stage 74 of the music-synchronized control server 7, as illustrated in the algorithm of FIG. 9, it is judged whether or not there are old IDs (identification) of which the timestamps have elapsed longer than a certain time (for example, one minute or more) from the last access at step ST91. If there is any, those IDs are deleted from the list of masters or slaves. This eliminates such connections with the at least music-synchronized control master 3 and the plurality of music-synchronized control slaves 5, thereby alleviating the workload of the music-synchronized control server 7. Moreover, when the number of music-synchronized control masters 3 to be connected is limited, a connection opportunity is given to more music-synchronized control masters 3. When the number of music-synchronized control slaves 5 to be connected is limited, a connection opportunity is given to more music-synchronized control slaves 5. Thus, with the ID issuance and management, it is possible to prevent more than the numbers of the music-synchronized controls master 3 and music-synchronized control slaves 5 as specified as the upper limits of the masters and slaves from being connected to the music-synchronized control server 7. Moreover, it is possible to get rid of the music-synchronized control slave 5 that have been already been disconnected from the music-synchronized control server 7 (the time has elapsed equal to or longer than a certain time since the last access, and it is not likely that an access is made therefrom) from the management.

[Functions of Music-Synchronized Control Master]

In the following sections, the functions and operations of the music-synchronized control master 3 will be described.

The master control section 35 of the at least one music-synchronized control master 3 has a function of controlling the master music playback player 31 and the master music-synchronized performer 32 by converting a timing in the reference clock time corresponding to the in-content playback timing, which is obtained from "the status of the virtual music playback player", to a timing in the individual clock time corresponding to the in-content playback timing.

Figure 10:
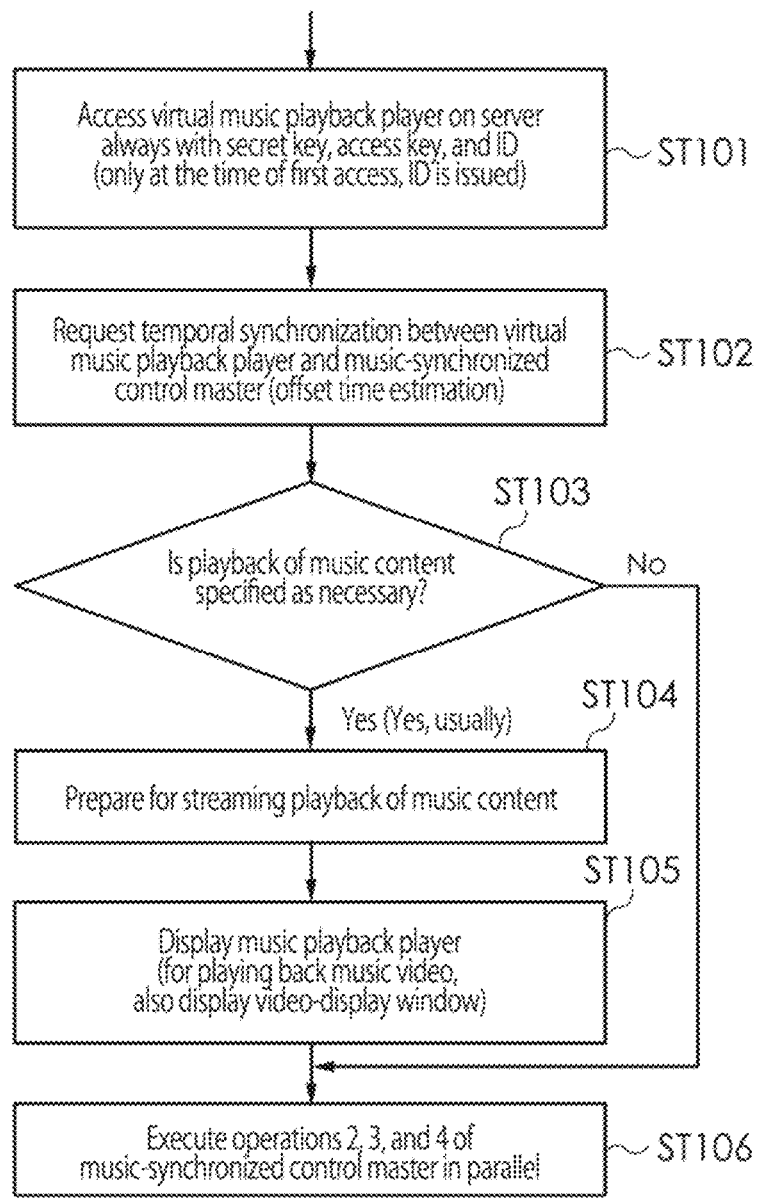
FIG. 10 is a flowchart illustrating an algorithm used in the music-synchronized control master.
Figure 11:
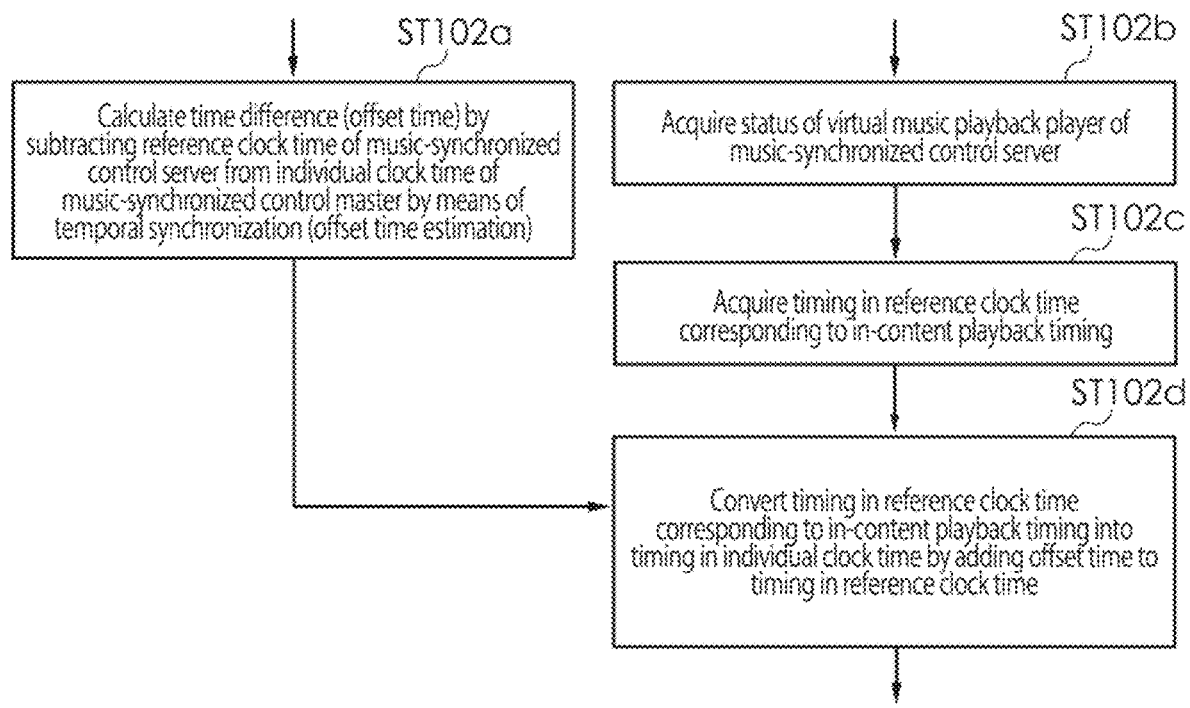
FIG. 11 is a flowchart illustrating an algorithm used in the music-synchronized control master.

Specifically, as illustrated in the algorithm of FIG. 10 (Operation 1 of Music-Synchronized Control Master), the master control section 35 of the at least one music-synchronized control master 3 accesses the music-synchronized control server 7 (at step ST101). The music-synchronized control master 3 requests temporal synchronization with the virtual music playback player 75, and receives the reference clock time and "the status of the virtual music playback player". The master control section 35 of the at least one music-synchronized control master 3 that has received "the status of the virtual music playback player" converts a timing in the reference clock time corresponding to the in-content playback timing, which is obtained from "the status of the virtual music playback player", to a timing in the individual clock time corresponding to the in-content playback timing. FIG. 11 illustrates the algorithm of this conversion. As is illustrated in FIG. 11, at step ST102a, the master control section 35 calculates a time difference (an offset time) by subtracting the reference clock time of the music-synchronized control server 7 from the individual clock time of the music-synchronized control master 3 by means of temporal synchronization (offset time estimation). The master control section 35 acquires the status of the virtual music playback player 75 of the music-synchronized control server 7 (at step ST102b). Next, it acquires the timing in the reference clock time corresponding to the in-content playback timing (at step ST102c). Lastly, it converts the acquired timing to the timing in the individual clock time corresponding to the in-content playback timing by adding the offset time to the timing in the reference clock time corresponding to the in-content playback timing (at step ST102d).

Following that, at step ST103 of FIG. 10, it is judged whether or not the user using the music-synchronized control master 3 specifies that playback of the music content is necessary. If the playback of the music content is necessary, streaming playback of the music content is prepared at step ST104. Then, at step ST105, the master control section 35 displays an input interface on the screen of the master music playback player in a display section 37. (In case of the playback in the music-synchronized performer, a video-display window is also displayed in the display section 37.) Then, the music-synchronized control master 3 executes the operations 2, 3, and 4 of the algorithm in parallel (at step ST106) as described later.

Figure 12:
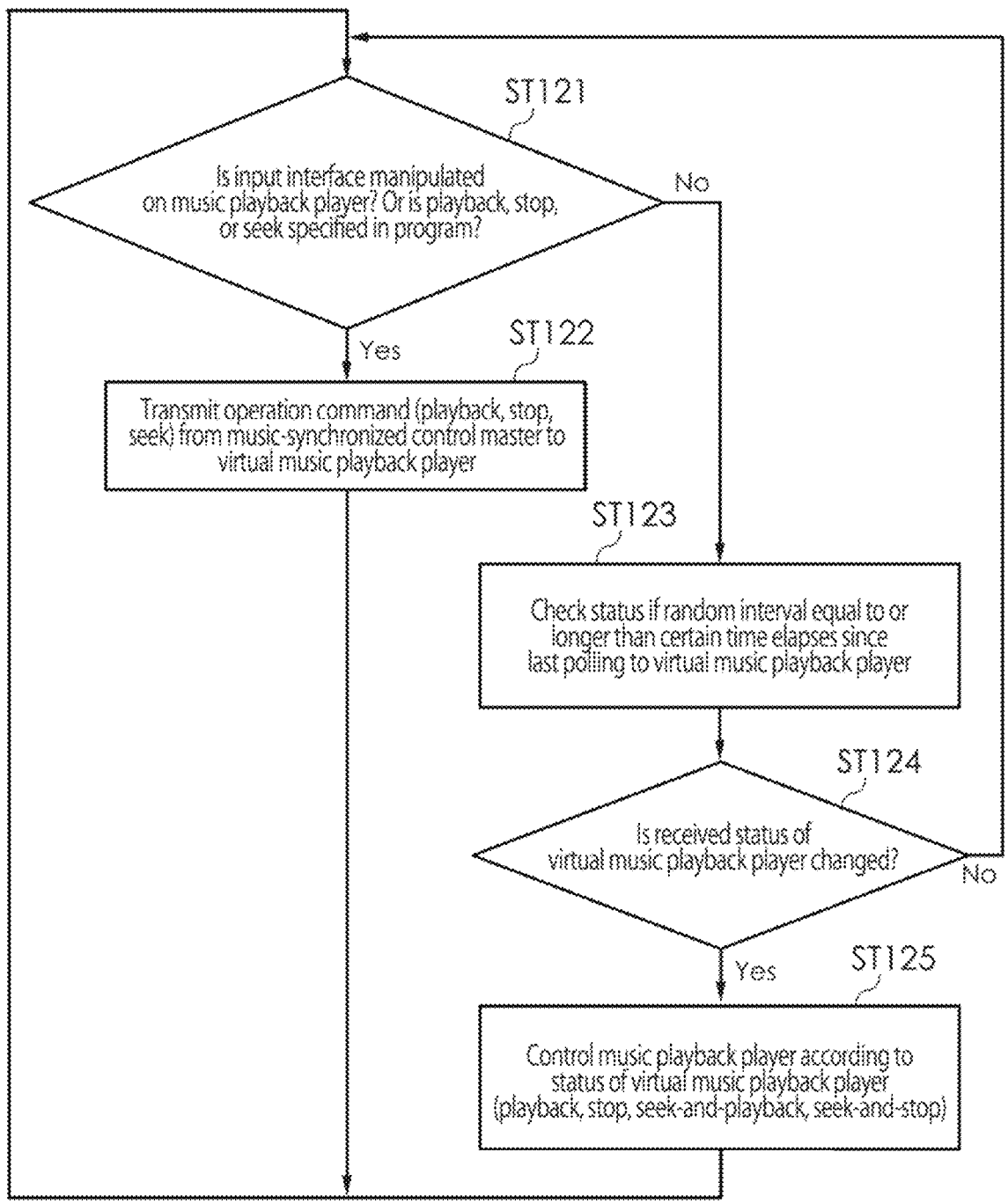
FIG. 12 is a flowchart illustrating an algorithm used in the music-synchronized control master.

FIG. 12 illustrates an example algorithm for the operation 2 bin which an operation command to change the status of the virtual music playback player of the music-synchronized control server 7 is transmitted from the music-synchronized control master 3. In the operation 2, it is judged at step T121 whether the input interface 38 is manipulated on the master music playback player of the music-synchronized control master 3, or an operation of playback, stop, or seek is specified in the program. Then, if yes, the process goes to step ST123, where the music-synchronized control master 3 transmits an operation command (playback, stop, and seek) to the virtual music playback player 75 of the music-synchronized control server 7. At step ST121, if an operation is not specified by an operation command, the process goes to step ST122 where the music-synchronized control master 3 inquires the control server of a status of the virtual music playback player if a random interval equal to or longer than a certain time has elapsed since the last inquiry of the status of the virtual music playback player. An inquiry of the status can be made at a constant interval, but employment of random interval can reduce the access workload of music-synchronized control server 7. At step 124, when a change in the status of the virtual music playback player is detected, the process goes to step ST125, and if there is no change in the status, the process goes back to step ST121. In the present embodiment, at step ST125, the master music playback player 31 is controlled according to the status of the virtual music playback player (according to the status such as playback, stop, seek-and-playback, and seek-and-stop). If the status of the virtual music playback player does not include seek-and-playback, and seek-and-stop, it is not necessary to include, in controlling the master music playback player 31, the control according to the seek-and-playback and the seek-and-stop.

Figure 13:
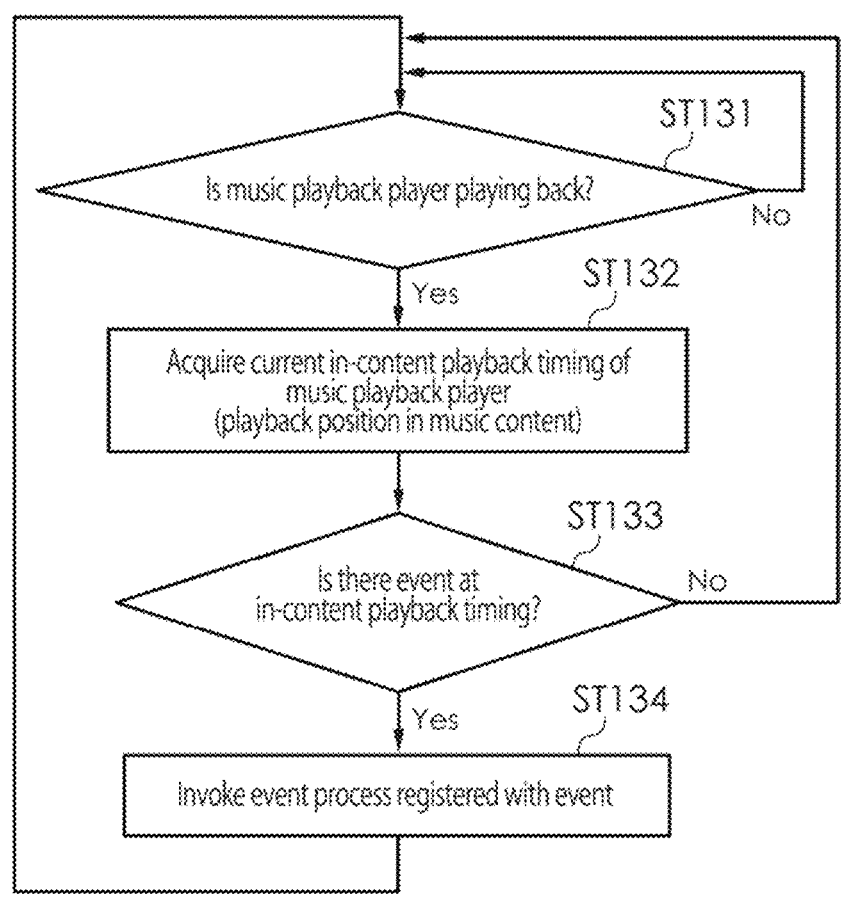
FIG. 13 is a flowchart illustrating an algorithm used in the music-synchronized control master.
Figure 14:
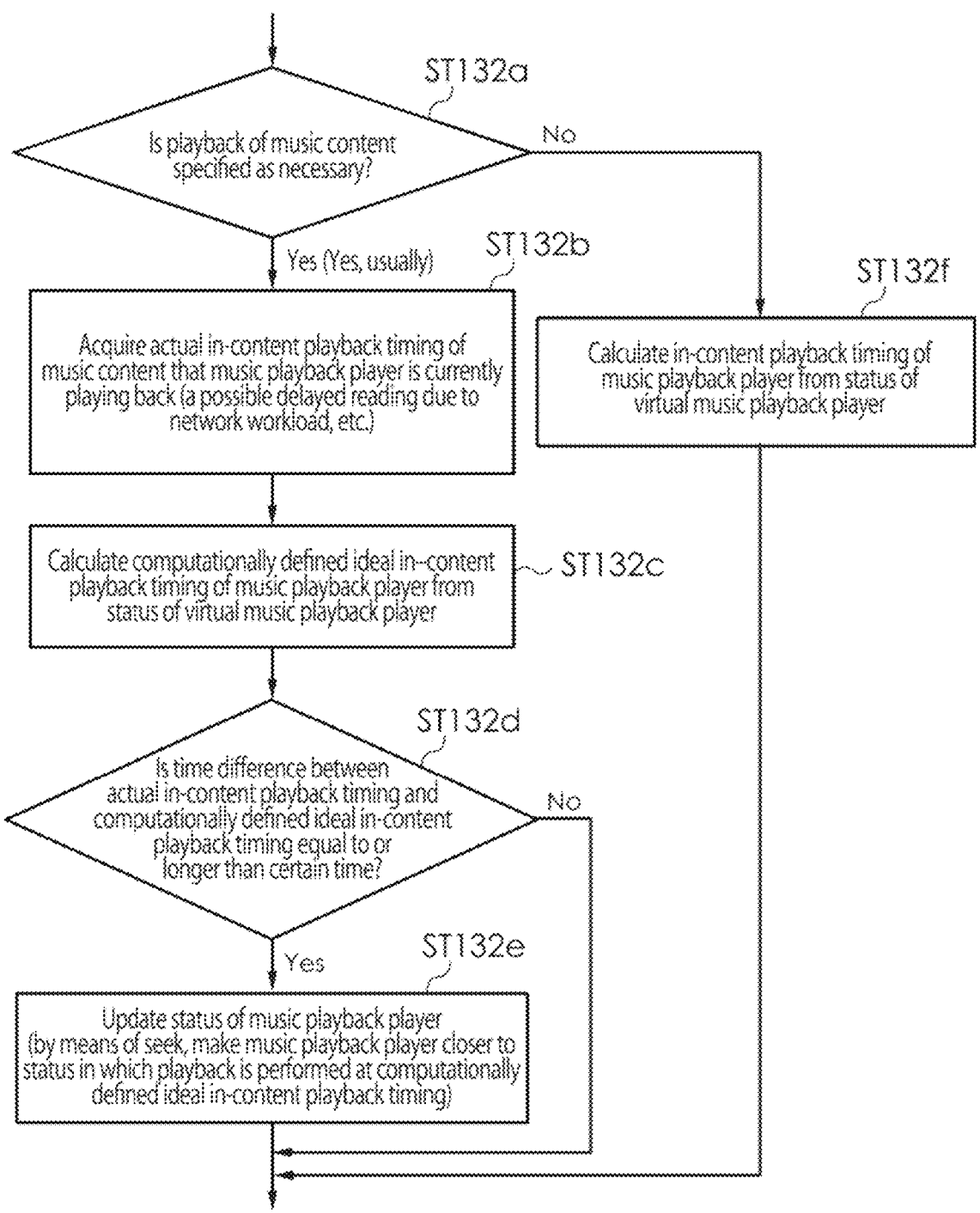
FIG. 14 is a flowchart illustrating an algorithm used in the music-synchronized control master.

FIG. 13 illustrates the algorithm of the operation 3 in executing a process of an event (an event process). In the operation 3, it is judged whether or not the master music playback player 31 is in playback motion at step ST131. If yes, the process goes to step ST132. At step ST132, the music-synchronized control master 3 acquires the current in-content playback timing (a playback position in the music content) of the master music playback player 31. FIG. 14 illustrates the detailed algorithm of step ST 132. First, at step ST132a, it is judged whether or not playback of the music content is specified as necessary. When the playback of the music content is not necessary, at step ST132f, the in-content playback timing of the master music playback player is calculated from "the status of the virtual music playback player". When the playback of the music content is specified as necessary, at step ST132b, the music-synchronized control master 3 acquires an actual in-content playback timing (a possible delayed reading due to network workload, etc.) of the music content that the master music playback player 31 is currently playing back at that moment. Then, at step ST132c, a computationally defined ideal in-content playback timing of the master music playback player 31 is calculated from the status of the virtual music playback player and is recorded. At step ST132d, it is judged whether or not a time difference between the actual in-content playback timing and the computationally defined ideal in-content playback timing is equal to or longer than a certain time. If yes, the process goes to step ST132e. At step ST132e, the status of the master music playback player 31 is updated (an operation to make the status closer to that of playback at the computationally defined ideal in-content playback timing by means of seek). With this, when the time difference with the reference clock time of the music-synchronized control server, which is obtained by the synchronization request command, becomes significantly large for some reason, it is possible to recover the synchronization substantially completely.

After executing step ST132, at step ST133, it is judged whether or not an event occurs at the in-content playback timing. If yes, at step ST134, an event process recorded with the event is invoked and executed. Here, an event is defined on a basis of a be a bar, a chorus section, a repeat section, or a chord. The music-synchronized control master 3 has a function of specifying an event process corresponding to at least one event according to the analysis result of a musical piece (a musical piece analysis result) include in the music content. More specifically, the master control section 35 has a function of acquiring an analysis result of a musical piece (a musical piece analysis result) corresponding to the music content whereby the musical piece analysis result includes at least one event, judging whether or not the in-content playback timings in the master music playback player becomes matched with an event timing of any event while the master music playback player is playing back, and accordingly executing an event process corresponding to the event having the matched event timing. With this, the event process of the event can be executed in synchronization with music. As a result, since the music-synchronized control master autonomously executes the event process of the event, the workload of the music-synchronized control server 7 will not be increased in connection with executing the event process of the event. Even when the network communication is intermittent, the event process of the event can be continuously executed.

In the present embodiment, since the master music-synchronized performer 32 is provided. The master music-synchronized performer 32 is controlled in synchronization with the musical piece analysis result by executing the event process of the event. Since the at least one music-synchronized control master 3 has a function of specifying the event process corresponding to at least one event according to the analysis result of a musical piece included in the music content. The user or programmer can freely specify the event process of an event. Further, diversified performances can be synchronized with the music and a variety of devices can be controlled.

Figure 15:
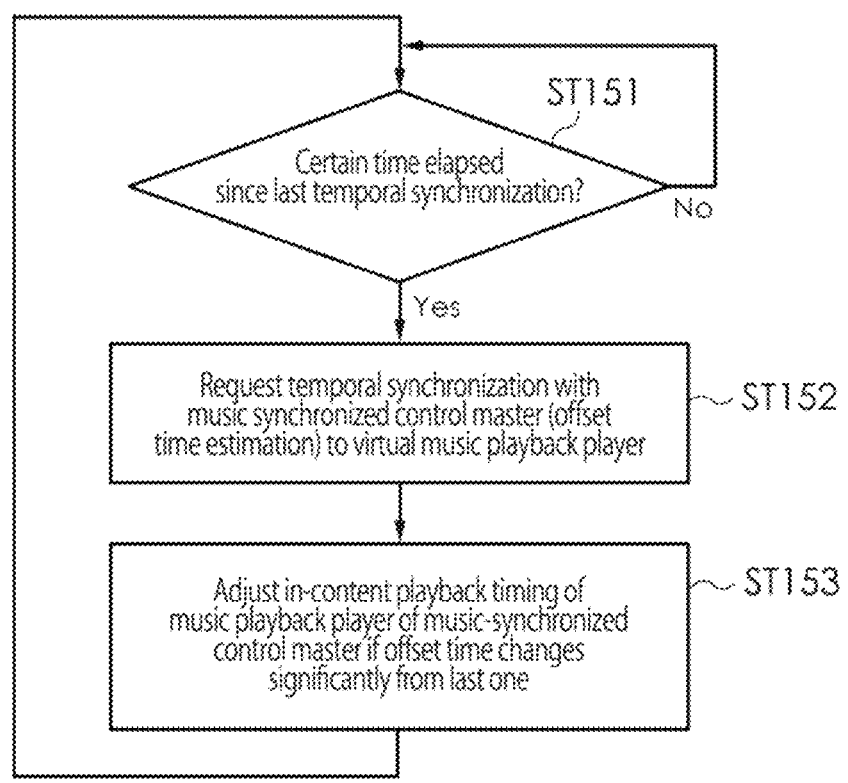
FIG. 15 is a flowchart illustrating an algorithm used in the music-synchronized control master.

FIG. 15 illustrates the algorithm of the operation of the music-synchronized control master. In the algorithm of the operation 4, at step ST151, it is judged whether or not a certain time has elapsed since the last temporal synchronization. If the certain time has elapsed, the process goes to step ST152. At step ST152, the music-synchronized control master 3 transmits a synchronization request command to the virtual music playback player 75 to request temporal synchronization (offset time estimation) with the music-synchronized control master 3, and acquires the reference clock time of the music-synchronized control server 7. Then, the master control section 35 of the music-synchronized control master 3 records a time difference from the reference clock time of the music-synchronized control server 7 as the offset time. The time difference from the reference clock time of the music-synchronized control server 7, for example, can be calculated from three clock times: an individual clock time A when the music-synchronized control master 3 transmits a synchronization request command to the music-synchronized control server 7, a reference clock time B when the music-synchronized control server 7 receives the synchronization request command, and an individual clock time C when the music-synchronized control master 3 receives information on the reference clock time B transmitted back from the music-synchronized control server 7 as a response to the synchronization request command. The time difference is obtained by adding two individual times A and C, then dividing it by two, and subtracting the reference clock time B from a resulting median value. Thus, the offset time is estimated. To increase estimation accuracy of the offset time and attain stable estimation, the operation for the offset time estimation may be repeated several times (for example, three times) (whereby transmission of a temporal synchronization request from the music-synchronized control master 3 to the music-synchronized control server 7, and reception of a response of the reference clock time from the music-synchronized control server 7 to the music-synchronized control master 3), and a median value or a mean value of the estimated offset times obtained from the repetition may be defined as the final offset time. If the offset time has largely varied or deviated from a predetermined value (for example, 100 ms or more), the master control section 35 of the music-synchronized control master 3 adjusts the computationally defined ideal in-content playback timing in the master music playback player 31 (at step ST153. With this, when the time difference becomes significantly large between the individual clock time and the reference clock time of the music-synchronized control server 7 as is obtained by requesting temporal synchronization, synchronized operations can substantially completely be recovered.

[Functions of Music-Synchronized Control Slaves]

In the following sections, the functions and operations of the music-synchronized control slaves 5 will be described.

The slave control section 55 of each of the plurality of music-synchronized control slaves 5 has a function of controlling the slave music playback player 51 or the slave music-synchronized performer 52 by converting a timing in the reference clock time corresponding to the in-content playback timing, which is obtained from "the status of the virtual music playback player", to a timing in the individual clock time corresponding to the in-content playback timing.

The slave control section 55 of each of the plurality of music-synchronized control slaves 5 has a function of controlling the slave music playback player 51 and the slave music-synchronized performer 52 by converting a timing in the reference clock time corresponding to the in-content playback timing, which is obtained from "the status of the virtual music playback player", to a timing in the individual clock time corresponding to the in-content playback timing, and plays back the music content as is obtained from the identifier such as an URL, or makes performances in synchronization with playback of the music content.

Figure 16:
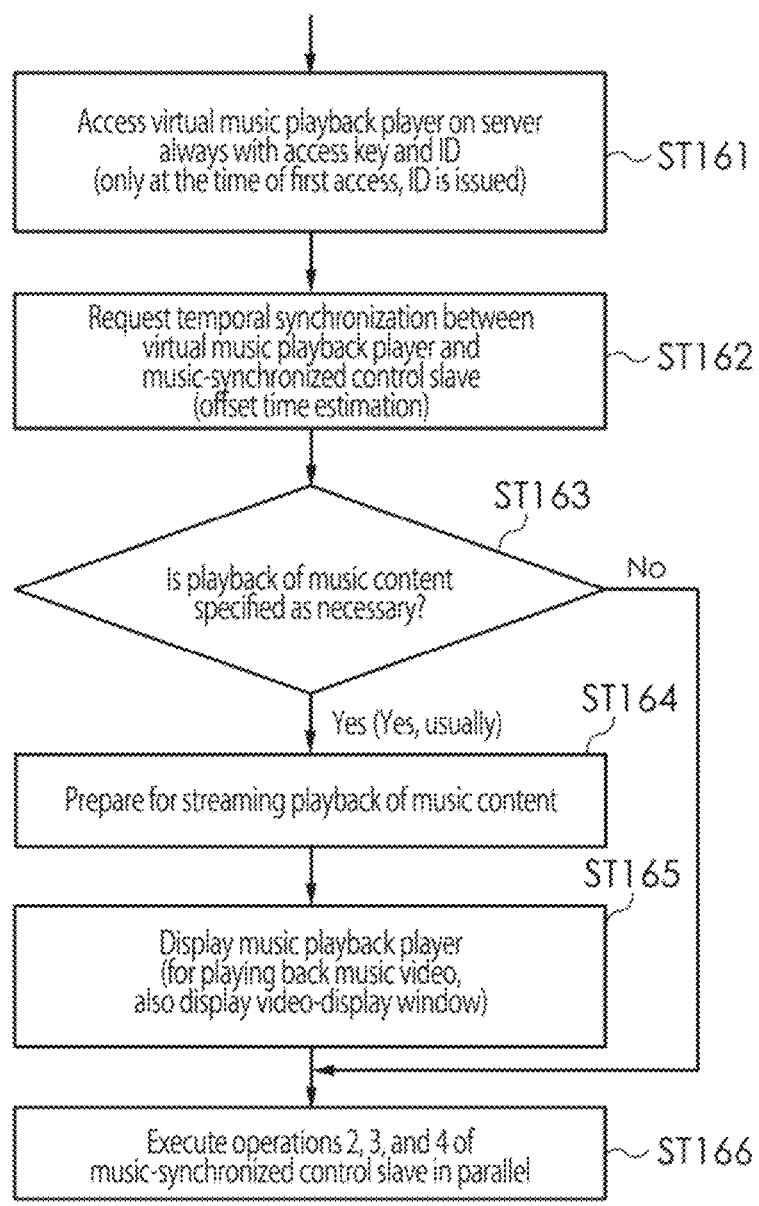
FIG. 16 is a flowchart illustrating an algorithm used in the music-synchronized control slave.
Figure 17:
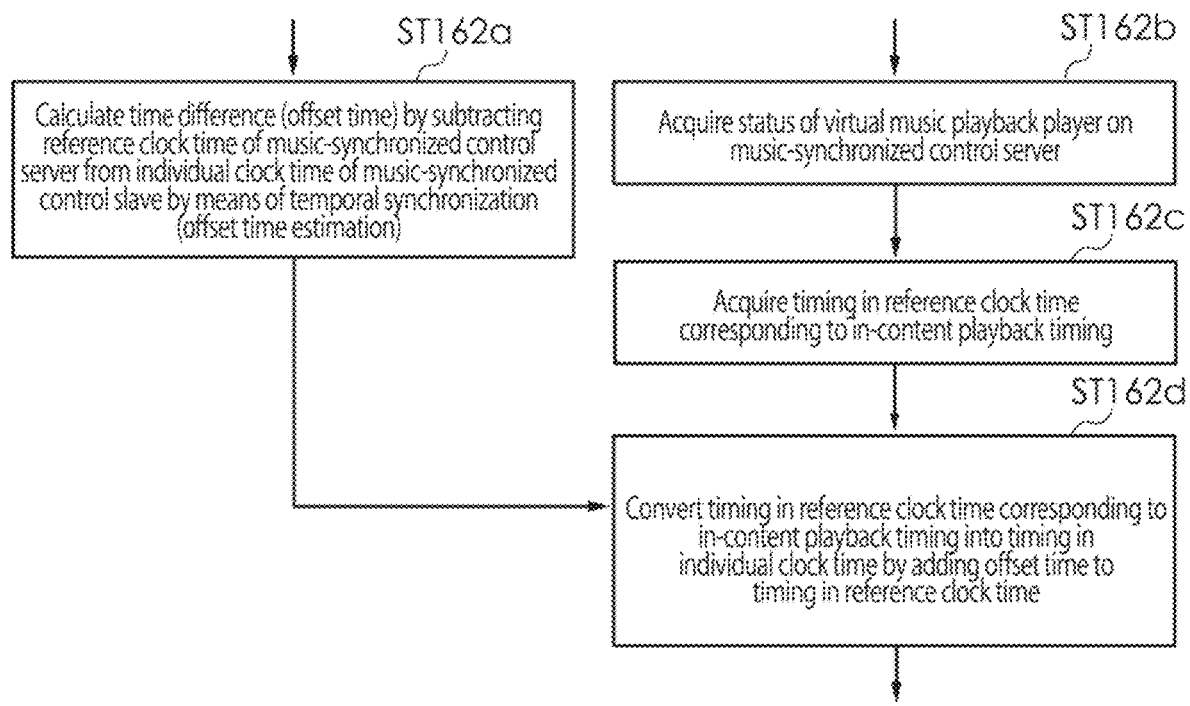
FIG. 17 is a flowchart illustrating an algorithm used in the music-synchronized control slave.

Specifically, as illustrated in the algorithm of FIG. 16 (Operation 1 of Music-Synchronized Control Slave), the control section 55 of each of the plurality of music-synchronized control slaves 5 accesses the music-synchronized control server 7 (at step ST161). The music-synchronized control slave 5 requests temporal synchronization with the virtual music playback player 75, and receives the reference clock time and "the status of the virtual music playback player". The slave control section 55 of the music-synchronized control slave 5 that has received "the status of the virtual music playback player" converts a timing in the reference clock time corresponding to the in-content playback timing, which is obtained from "the status of the virtual music playback player", to a timing in the individual clock time corresponding to the in-content playback timing. FIG. 17 illustrates the algorithms of this conversion. As illustrated in FIG. 17, at step ST162a, the slave control section 55 calculates a time difference (an offset time) by subtracting the reference clock time of the music-synchronized control server 7 from the individual clock time of the music-synchronized control slave 5 by means of temporal synchronization (offset time estimation). The slave control section 55 acquires the status of the virtual music playback player 75 of the music-synchronized control server 7 (at step ST162b).

Next, it acquires the timing in the reference clock time corresponding to the in-content playback timing (at step ST162c). Lastly, it converts the acquired timing to the timing in the individual clock time corresponding to the in-content playback timing by adding the offset time to the timing in the reference clock time corresponding to the in-content playback timing (at step ST162d).

Following that, at step ST163 of FIG. 16, it is judged whether or not the user using the music-synchronized control slave 5 specifies that playback of the music content is necessary. If the playback of the music content is necessary, streaming playback of the music content is prepared at step ST164. Then, at step ST1165, the slave control section 55 displays an input interface on the screen of the slave music playback player in a display section 57. (In case of the playback in the music-synchronized performer, an image display window is also displayed in the display section 57.) Then, the music-synchronized control slave 5 executes the operations 2, 3, and 4 of the algorithm in parallel (at step ST166) as described later.

Figure 18:
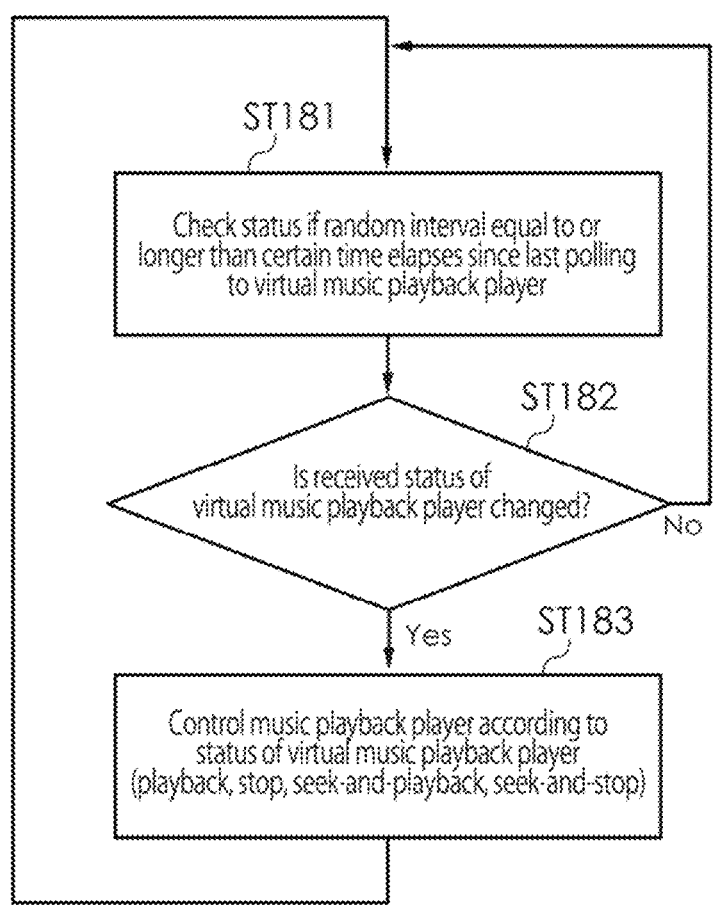
FIG. 18 is a flowchart illustrating an algorithm used in the music-synchronized control slave.

FIG. 18 illustrates an example algorithm of the operation 2 of the music-synchronized control slave 5. In this algorithm, at step ST181, the music-synchronized control slave 5 inquires the control server of "the status of the virtual music playback player" if a random interval longer than a certain time has elapsed since the last inquiry of the status to the server. Here, an inquiry of the status can be made at a constant interval, but employment of random interval can reduce the access workload of the music-synchronized control server 7. At step 182, when a change in the status of the virtual music playback player is detected, the process goes to step ST183. If there is no change in the status, the process goes back to step ST181. At step ST183, the slave music playback player 51 is controlled according to the status of the virtual music playback player (according to the status such as playback, stop, seek-and-playback, and seek-and-stop). If the status of the virtual music playback player does not include seek-and-playback and seek-and-stop, it is not necessary to include, in controlling the slave music playback player 51, the control according to the seek-and-playback and the seek-and-stop.

Figure 19:
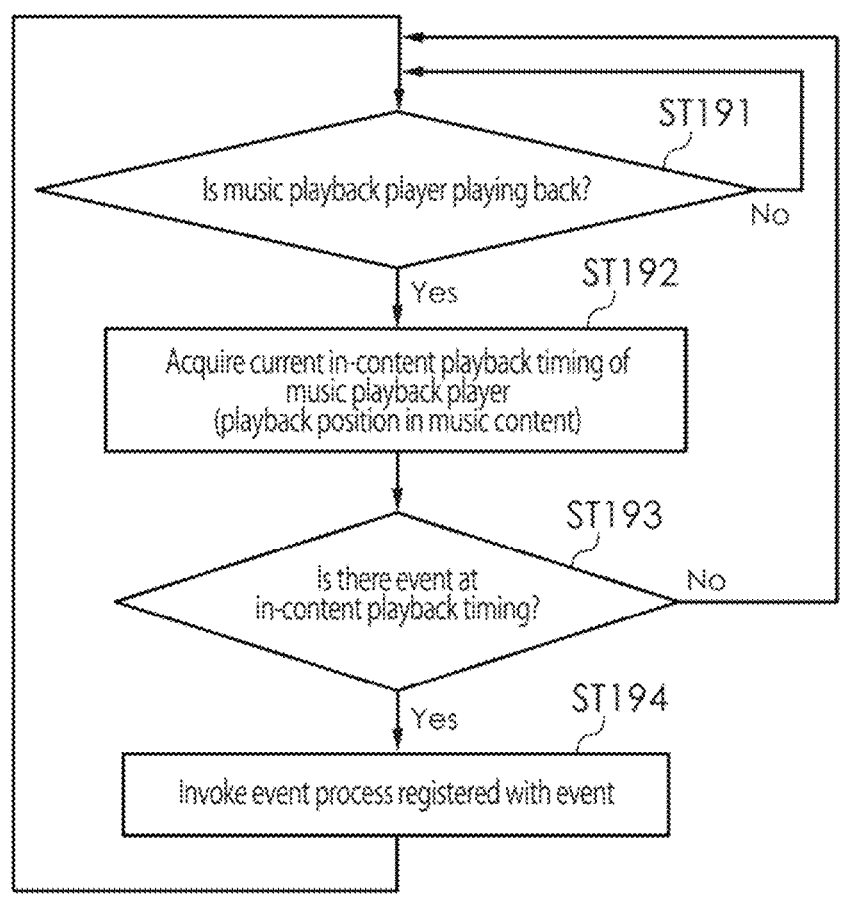
FIG. 19 is a flowchart illustrating an algorithm used in the music-synchronized control slave.

FIG. 19 illustrates the algorithm of the operation 3 in executing an event process (a process content of the event). In the operation 3, it is judged whether or not the slave music playback player 51 is in playback motion at step ST191. If yes, the process goes to step ST192. At step ST192, the music-synchronized control slave 5 acquires the current in-content playback timing (a playback position in the music content) of the slave music playback player 51. The detailed algorithm of step ST192 is substantially the same as the algorithm illustrated in FIG. 14. First, it is judged whether or not playback of the music content is specified as necessary. When the playback of the music content is not necessary, the in-content playback timing of the slave music playback player is calculated from "the status of the virtual music playback player". When the playback of the music content is specified as necessary, the music-synchronized control slave 5 acquires an actual in-content playback timing (a possible delayed reading due to network workload, etc.) of the music content that the slave music playback player 35 is currently playing back at that moment. Then, a computationally defined ideal in-content playback timing of the slave music playback player 51 is calculated from the status of the virtual music playback player and is recorded. It is judged whether or not a time difference between the actual in-content playback timing and the computationally defined ideal in-content playback timing is equal to or longer than a certain time. If yes as is judged, the status of the slave music playback player 51 is updated (an operation to make the status closer to that of playback at the computationally defined ideal in-content playback timing by means of seek). With this, when the time difference with the reference timing of the music-synchronized control server as is obtained by the synchronization request command becomes significantly large for some reason, it is possible to recover the synchronization substantially completely.

After executing step ST192, at step ST193, it is judged whether or not an event occurs at the in-content playback timing. If yes, at step ST194, a process registered with the event is invoked and executed. The music-synchronized control slave 5 has a function of specifying an event process corresponding to at least one event according to the analysis result of a musical piece include in the music content. More specifically, the slave control section 55 has a function of acquiring an analysis result of a musical piece (a musical piece analysis result) corresponding to the music content whereby the musical piece analysis result includes at least one event, judging whether or not the in-content playback timing in the slave music playback player becomes matched with an event timing of any event while the slave music playback player is playing back, and accordingly executing an event process corresponding to the event having the matched event timing. With this, the event process of the event can be executed in synchronization with music. As a result, since the music-synchronized control slave autonomously executes the event process of the event, the workload of the music-synchronized control server 7 will not be increased in connection with executing the event process of the event. Even when the network communication is intermittent, the event process of the event can be continuously executed.

In the present embodiment, the slave music-synchronized performer 52 is provided. The slave music-synchronized performer 52 is controlled in synchronization with the musical piece analysis result by executing the event process of the event. Since the plurality of music-synchronized control slaves 5 each have a function of specifying the event process corresponding to at least one event according to the analysis result of musical piece included in the music content.

Figure 20:
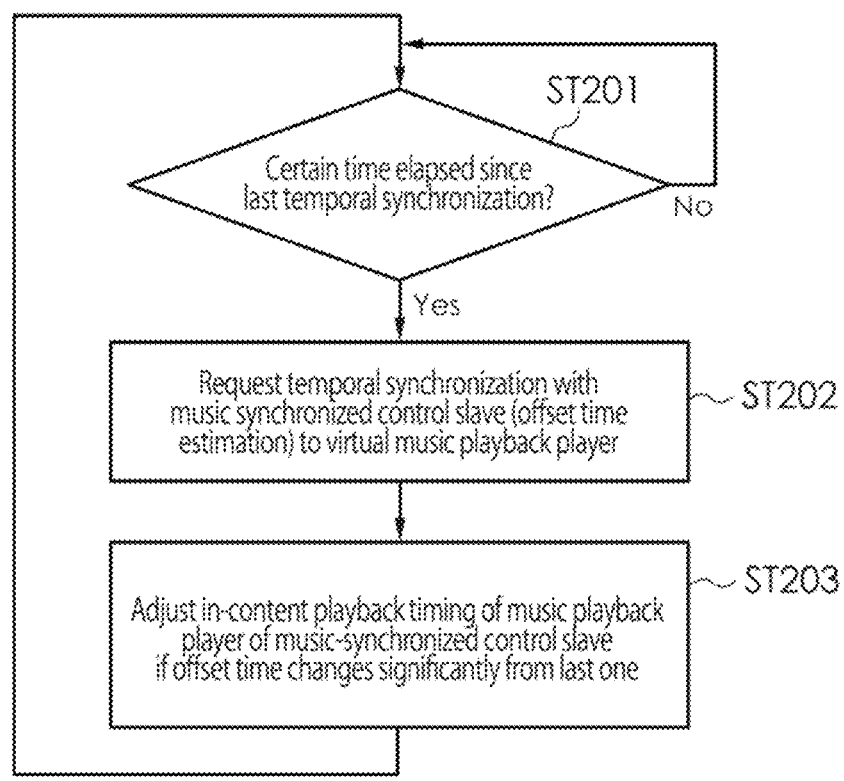
FIG. 20 is a flowchart illustrating an algorithm used in the music-synchronized control slave.

FIG. 20 illustrates the algorithm of the operation 4 of the music-synchronized control slave. In the algorithm of the operation 4, at step ST201, it is judged whether or not a certain time has elapsed since the last temporal synchronization. If the certain time has elapsed, the process goes to step ST202. At step ST202, the music-synchronized control slave 5 transmits a synchronization request command to the virtual music playback player 75 to request temporal synchronization (offset time estimation) with the music-synchronized control slave 5, and acquires the reference clock time of the music-synchronized control server 7. Then, the slave control section 55 of the music-synchronized control slave 5 records a time difference from the reference clock time of the music-synchronized control server 7 as the offset time. The time difference from the reference clock time of the music-synchronized control server 7, for example, can be calculated from three clock times: an individual clock time A when the music-synchronized control slave 5 transmits a synchronization request command to the music-synchronized control server 7, a reference clock time B when the music-synchronized control server 7 receives the synchronization request command, and an individual clock time C when the music-synchronized control slave 5 receives information on the reference clock time B transmitted back from the music-synchronized control server 7 as a response to the synchronization request command. The time difference is obtained by adding two individual times A and C, then dividing it by two, and subtracting the reference clock time B from a resulting median value. Thus, the offset time is estimated. To increase estimation accuracy of the offset time and attain stable estimation, the operation for the offset time estimation may be repeated several times (for example, three times) (whereby transmission of a temporal synchronization request from the music-synchronized control slave 5 to the music-synchronized control server 7, and reception of a response of the reference clock time from the music-synchronized control server 7 to the music-synchronized control slave 5), and a median value or a mean value of the estimated offset times obtained from the repetition may be defined as the final offset time. If the offset time has largely varied or deviated from a predetermined value (for example, 100 ms or more), the slave control section 55 of the music-synchronized control slave 5 adjusts the computationally defined ideal in-content playback timing in the slave music playback player 51 at step TS203). With this, when the time difference becomes significantly large between the individual clock time and the reference clock time of the music-synchronized control server 7 as is obtained by requesting temporal synchronization, synchronized operations can substantially completely be recovered.

[Functions of Music-Synchronized Control Application on Music-Synchronized Control Platform]

Figure 21:
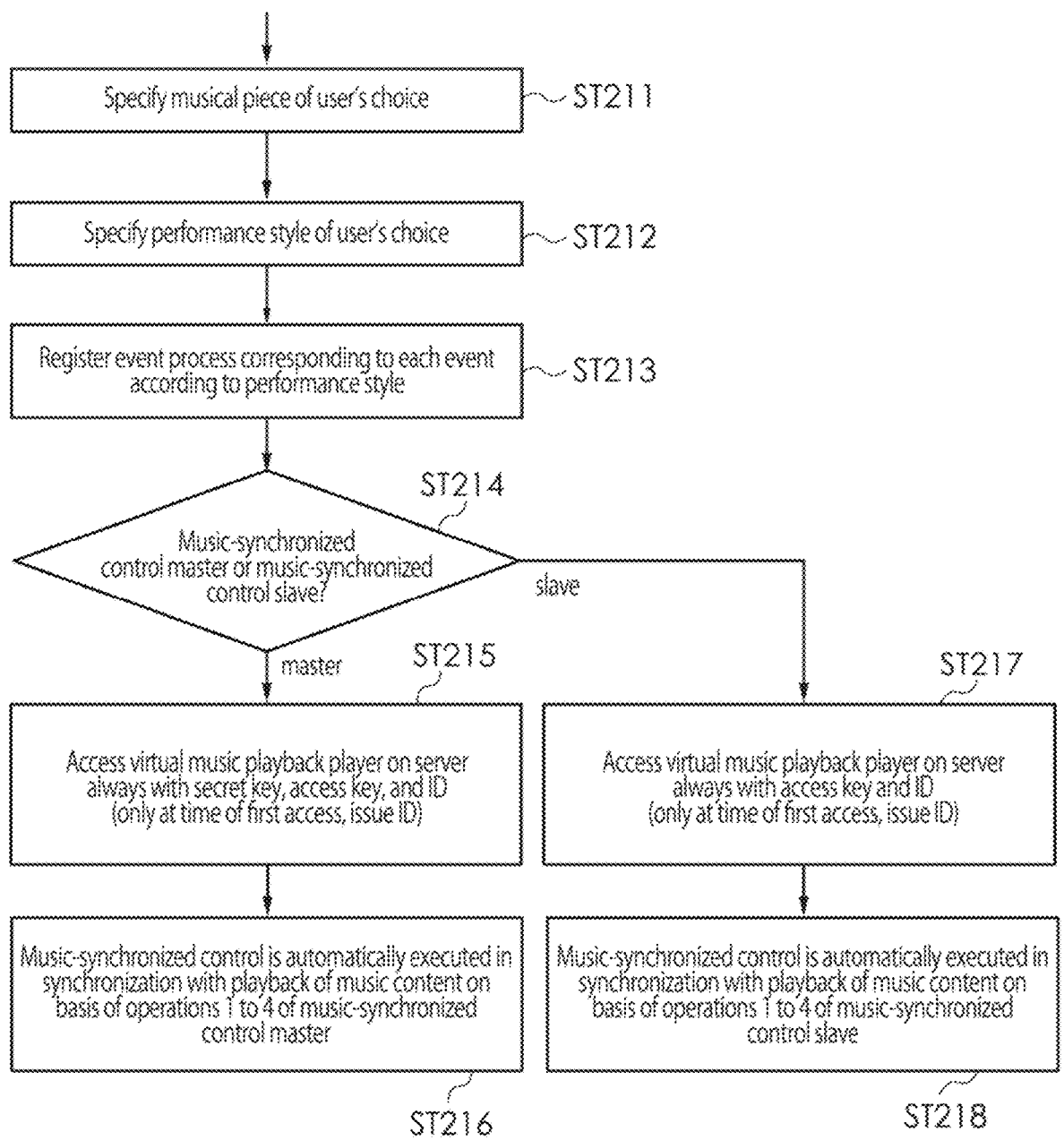
FIG. 21 is a flowchart illustrating an algorithm used in a music-synchronized control application implemented on the music-synchronized control platform according to the embodiment of the present invention.

FIG. 21 illustrates an algorithm used in an example music-synchronized control application working on the music-synchronized control platform according to the present embodiment. Using this operation algorithm, the operations of the music-synchronized control application on the music-synchronized control master 3 and the music-synchronized control slave 5 will be described below. First, the music-synchronized control application specifies a musical piece chosen by the user for the music-synchronized control master 3 on the virtual music playback player 75 of the music-synchronized control server 7 (at step ST211). Next, the application specifies a performance style chosen by the user of the music-synchronized control master 3 and/or the music-synchronized control slave 5 respectively on the music-synchronized control master 3 and/or the music-synchronized control slave 5. The application registers the event process of each event on the master control section 35 of the music-synchronized control master 3 and/or the slave control section 55 of the music-synchronized control slave 5 according to the chosen performance style (at steps ST212 and 213). Then, since the operation of the music-synchronized control application differs depending on whether it is the music-synchronized control master 3 or the music-synchronized control slave 5, the subsequent operations to be executed are judged (at step ST214). For the music-synchronized control master 3, the secret key, the access key, and ID are always used to access the virtual music playback player 75 of the music-synchronized control server 7 (at step ST215). In the music-synchronized control master 3, music-synchronized control is automatically executed in synchronization with the playback of the music content according to the algorithms of the operations 1 to 4 (at step ST216). For the music-synchronized control slave 5, the access key and ID are always used to access the virtual music playback player 75 of the music-synchronized control server 7 (at step ST217). In the music-synchronized control slave 5, music-synchronized control is automatically executed in synchronization with the playback of the music content according to the algorithms of the operations 1 to 4 (at step ST218).

[Development Circumstances for Working of Present Embodiment]

The applicant has been working on research and development aimed at making academic, industrial and cultural contributions by enriching people's music experience more than ever on a basis of music understanding technologies. They have so far developed "Songle" (https://songle.jp), an active music appreciation service that visualizes musical pieces on the web by using music understanding technologies, "Songrium" (https://Songrium.jp) a music audience support service that enables comprehensive appreciation of a huge amount of music contents, and "TextAlive" (https://textalive.jp), a lyric animation creation support service that animates lyrics in synchronization with music. These services have been available to the public (Aug. 29, 2012, Aug. 27, 2013, and Sep. 8, 2015, respectively on the press release jointly by AIST and JST).

Through these research and developments, it has become known that expressions and control in synchronization with music are valued and people are much interested in them. Then, the applicant has developed the "Songle Widget" framework (https://widget.sonlge.jp) that enables analysis results of musical pieces (a beat, a bar, a chorus section, etc.) to be performed in synchronization with music by using a web browser on a single personal computer. This framework was experimentally announced to the public in August, 2014.

Then, the applicant started to study and develop a novel framework for the present patent application, and has a novel framework for controlling a variety of devices so as to work in synchronization with music that has been impossible with conventional frameworks. With this novel framework, people can enjoy music-synchronized control of the same musical piece regardless of the venue and the number of people in any Internet-connected circumstances. The present application relates to this technology resulting from the applicant's development effort.

[Development Contents]

The applicant has developed this novel framework as a basis of the present invention. The novel framework enables more than 100 people to simultaneously control a variety of their own off-the-shelf mobile terminals (smartphones, tablets, etc.), personal computers, and Internet of Things (IoT) devices in synchronization with the playback of a musical piece on the web. In the platform according to the present embodiment of the present invention that is based on the thus developed fundamental technology, diversified devices can autonomously play back the musical piece and make diversified performances in synchronization with the playing music without problems in various implementations where a number of devices are freely combined even when Internet communications are intermittent. People can readily combine different performances and change the performances with this framework.

An example music-synchronized control application (App, an abbreviation) that has already been implemented using the platform of the present embodiment can be utilized by the following steps.

(1) Choice of a Musical Piece and Performance Style

The user uses a smartphone or a web browser on a personal computer to choose a musical piece available on the website (audio files in MP3 format, and musical pieces and music videos provided by the music or video sharing services) and several kinds of "performance styles" that determine the performance style over the entirety of the musical piece according to the user's preference. Then, a music playback player is displayed, and the music piece on the web is streaming played and CG animations (CG images) varying with the beats and bars are depicted according to the chosen performance style. Thus the user can enjoy the musical piece with both eyes and ears.

(2) Issuance of an Access Key

In the platform of the present embodiment, an access key (e.g. a character string, URL, QR code, etc.) is issued for various people to connect to the virtual music playback player. The user notifies this access key to other people with whom the user wishes to enjoy the music and performance together.

(3) Music Synchronization of General Purpose Devices Via Network

When the notified access key is input to other people's smartphones and web browsers on the personal computers, the music playback player for the same music piece is displayed on the interface. Thus, regardless of the venues, all the people can enjoy the same musical piece and animation synchronously at the same moment. Even when connection is made in the middle of the musical piece, synchronization among the people is attained. Moreover, if the user who has notified the access key to other people changes the musical piece, or plays back the musical piece or stops it, the musical piece and animation are changed or played or stopped in synchronization with the thus made change, playback and stop. Only either of the musical piece and animation can be chosen. For example, the user that has distributed the access key can display the same animation on the smartphone screens of the neighboring people without playing the musical piece while the user and neighboring people are listening together to the music emitted from the user's speaker.

With the use of the platform of the present embodiment, the programmer can freely and readily develop a music-synchronized control application itself, which plays back the music contents and depicts the performances, simply by changing a sample program of performance style using a development kit. Here, there is no need to be aware of controlling a lot of devices, and the temporal synchronization with other devices can automatically be attained only by means of programming, assuming to control a single device.

[Features of Present Embodiment]

(1) Implementation of Synchronized Control of a Variety of Mobile Terminals, Personal Computers and IoT Devices while Playing Back a Musical Piece on the Web In the platform of the present embodiment, the analysis results of more than one million musical pieces available on the website that have been automatically made by the music service, "Songle" can be instantly utilized to enjoy performances in synchronization with different musical pieces. If a musical piece that the user wishes to playback has not automatically analyzed yet, automatic analysis will be made once the URL of the target musical piece is registered, and then that musical piece can be played back. The Songle and the platform of the present embodiment do not have a function of music download (online distribution) and musical piece upload. The musical piece is designed to be streaming played from the original website. The performance style of the platform of the present embodiment is highly versatile and can be utilized from ordinary web browsers capable of executing JavaScript (a registered trademark). With the platform of the present embodiment, it is possible to synchronously control a variety of devices such as personal computers having different OS, "Windows" (a registered trademark) and "MacOS" (a registered trademark) installed thereon, and smartphones and tablets having different OS such as "iOS" (a registered trademark) and "Android" (a registered trademark) installed thereon. Further, with Node.js that enables the JavaScript Environment to work on the server, performances are possible by utilizing the small and lightweight terminal Raspberry Pi and IoT devices (e.g. robots, lighting equipment, decorative LEDs for costumes).

Use cases of the platform of the present embodiments have actually been developed to enable music-synchronized control simply by choosing and playing back a musical piece. It has been confirmed that various performance styles using a variety of devices can readily be developed.

(a) Display Screen

Animations could be displayed on the screen in synchronization with music, using personal computers, iPhone (a registered trademark), iPad (a registered trademark), iPod touch (a registered trademark), Android (a registered trademark) phones, Raspberry Pi (a registered trademark), etc.

(b) Space Performance Control

Lightings and lights of the room and environment could be varied in synchronization with music, using household goods (vases, candles, etc.) having built-in lighting equipment or LEDs.]

(c) Fashion Goods Control

Light emitting control could be synchronized with music, using costumes equipped with or having built-in lighting devices or LEDs.

(d) Mechanical Control

Robots could be moved and caused to open and shut curtains, using small robots and electrical curtains.

Figure 22:
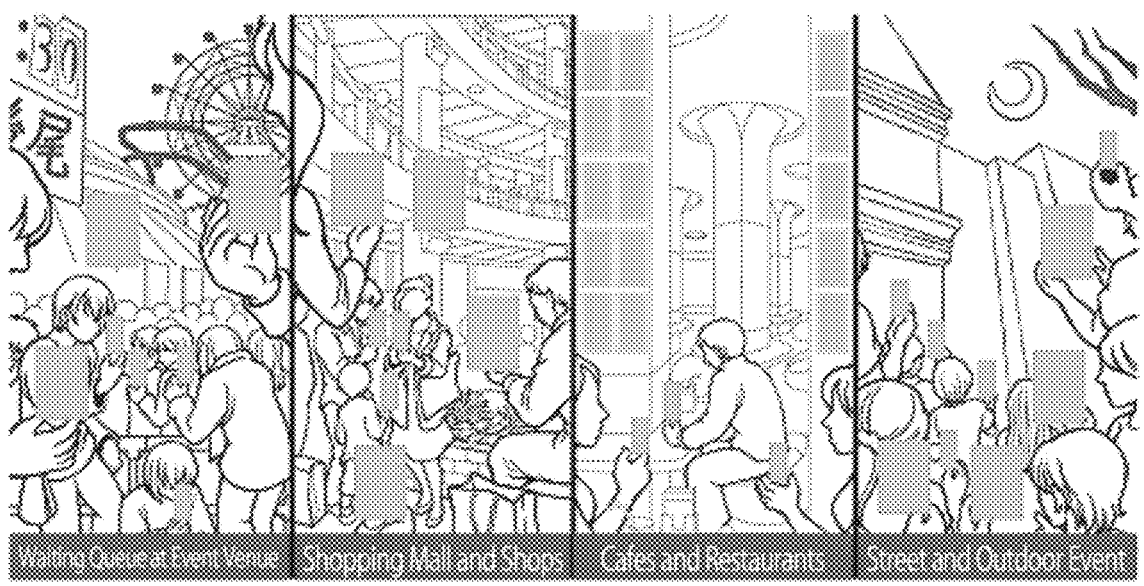
FIG. 22 illustrates use scenes of the music-synchronized control platform according to the embodiment of the present invention.

(2) Creation of New Values in Various Use Scenes by Music Experience Based on Music-Synchronized Control at Scale If people utilize the platform of the present embodiment, the same musical piece sounds simultaneously from the speakers of off-the-shelf mobile terminals and personal computers once the playback of the musical piece starts. Moreover, diversified music-synchronized animations can be displayed on the screens of these devices. Conventionally, such music experience has been impossible. In future, a new value can be created in such use scenes as illustrated in FIG. 22, for example, (a) Live Event Venues New performances will be enabled such that diversified animations are displayed on screens of the visitors' smartphones. Further, the same animations can be displayed on a number of large screens at the venue, and the costumes and wrist bands of the stage presenters can be caused to emit light. After the audience have been seated and before the live event is commenced, or when the visitors are queuing at the entrance of the event venue, such performances as letting the visitors enjoy with a sense of unity can be made by making most of the music-synchronized control.

(b) Shopping Moll and Shops

Music-synchronized performances can be made in synchronization with background music (BGM) at various places such as on the streets and on the walls and floors of the shops. A sense of unity can be created over the entirety of the shopping mall and shops by means of performances of music-synchronized large lighting devices and projectors. Further, synchronizing the visitors' smartphones with the BGM may be effective.

(c) Cafes and Restaurants

Performances such as changing the atmosphere or mood and presenting different impressions of shops and restaurants can be made by synchronizing indirect lightings and display and illumination equipment with the background music (BGM).

(d) Town Streets and Outdoor Events

In an occasion such as an outdoor event using the entirety of a town, the visitors to the town can enjoy simultaneously the music-synchronized performances by combining various existing displays and lightings, or projection mappings that have been already installed. If the QR code, which allows the visitors to experience specially prepared by the sponsors, is distributed to the visitors in advance, the visitors to the town can simultaneously enjoy music-synchronized performances.

(3) Providing a Platform that Enables the Programmers to Readily Develop Use Cases of Music-Synchronized Control The platform of the present embodiment not only enables the user to have a new music experience in which his or her device is readily synchronized with other people's devices, but also enables the programmer to have a new programming experience in which large-scaled music-synchronized control can readily be performed. For this purpose, the development kit API (Application Programming Interface), sample programs, and tutorials are provided.

(a) No Need for the Programmer to be Aware of Time Management for Synchronization with Music The programmer can simply write program codes based on event-driven programming in which this motion (performance) should be triggered at the beginning of a bar of a musical piece, or this lighting change (performance) should be triggered when a chorus section is entered. Such programmed performances defined for events can automatically be executed when the playback time of the musical piece reaches the timing of each event. Moreover, there is no need to manually annotate the events for each musical piece, and the musical piece analysis result (a beat, a bar, a chorus section, a repeat section, and a chord) can be used as events.

(b) No Need for the Programmer to be Aware of the Music-Synchronized Control with Other Devices The programmer can simply write program codes of an application for a single device while keeping in mind a single device only (without writing codes for multiple devices). The program codes can automatically enable that single device to be synchronized with a lot of other devices. Moreover, various types of applications individually developed, such as an application working on the web browser of the smartphone and a personal computer, an application for controlling a robot, and an application for controlling lightings, can be simultaneously used and synchronized with the playback of a musical piece. Thus, the programmer can attain a large-scaled music-synchronized control without being aware of communications and synchronization with other devices.

The platform of the present embodiment is a general purpose platform on which various programmers can develop music-synchronized applications for attaining diversified performances. The platform has high expandability and scalability and is excellent in that performances are not fixed. If each device autonomously works in synchronization with the playback of a musical piece via communications with the server, it can be regarded that the devices as a whole work synchronously without communicating with each other. Placing an focus on this, performances are designed to be event-driven autonomously according to the playback timing of a musical piece after each device has acquired the musical piece analysis result at the time of connection and been temporally synchronized, so as not to cause problems even if the communications are intermittent. Autonomous adjustment is made on each device so as not to cause a playback time difference of the music playback player in each device. With this, the operations of each device will hardly be affected even if the number of devices connected to the server is increased, and each device is enabled to participate in the performances in the middle of the musical piece. Further, implementation was made based on the web standard technologies in order to avoid a problem that the music-synchronized control framework is device dependent and results in making device interconnection difficult. This enables the programmer to let the application written in JavaScript work in a wide range of implementation environment (an ordinary web browser capable of executing JavaScript, JavaScript Environment enabled by Node.js, etc.). It also enables the user to conveniently utilize the application by using a QR code, etc.

INDUSTRIAL APPLICABILITY

According to the present invention, the same music contents can be played back substantially synchronously in at least one music-synchronized control master and a plurality of music-synchronized control slaves by using the status of a virtual music playback player of a music-synchronized control server as a reference even when individual clock times of the at least one music-synchronized control master and the plurality of music-synchronized control slaves are not aligned (synchronized) with a reference clock time in the music-synchronized control server. Further, in the plurality of music-synchronized control slaves, slave music-synchronized performers can be operated in synchronization with the playback of music contents.

DESCRIPTION OF REFERENCE NUMERALS

1 Music-Synchronized Control Platform
3 Music-Synchronized Control Master
31 Master Music Playback Player
32 Master Music-Synchronized Performer
33 Individual Clock Time Generator
34 Communication Means
35 Master Control Section
36 Master Processor
37 Display Section
38 Input Interface
5 Music-Synchronized Control Slave
51 Slave Music Playback Player
52 Slave Music-Synchronized Performer
53 Individual Clock Time Generator
54 Communication Means
55 Slave Control Section
56 Slave Processor
57 Display Section
58 Input Interface
7 Music-Synchronized Control Server
71 Individual Clock Time Generator
72 Communication Means
73 Server Processor
74 Stage
75 Virtual Music Playback Player
9 Musical Piece Analysis Section

The invention claimed is:

1. A music-synchronized control platform configured to synchronize music playback or music-synchronized performance or both with music in a plurality of devices, the platform comprising:

at least one music-synchronized control master including a master music playback player and a master processor including an individual clock time generator that generates an individual clock time, a communication means, and a master control section for the master music playback player, and being configured to control the master music playback player so as to play back a music content chosen from a plurality of music contents;

a plurality of music-synchronized control slaves, each including a slave music playback player or a slave music-synchronized performer or both, and a slave processor including an individual clock time generator that generates an individual clock time, a communication means, and a slave control section for the slave music playback player or the slave music-synchronized performer or both, and being configured to control the slave music playback player or the slave music-synchronized performer or both; and a music-synchronized control server including a server processor including a reference clock time generator that generates a reference clock time, and a communication means connected to the at least one music-synchronized control master and the plurality of music-synchronized control slaves via a communication network; wherein the server processor is configured to:

create a stage and a virtual music playback player when a stage create command is input from the at least one music-synchronized control master;

delete the virtual music playback player and the stage when a stage delete command is input from the at least one music-synchronized control master;

update a status of the virtual music playback player when an operation command relating to playback of the music content is input from the at least one music-synchronized control master;

respond with a status of the virtual music playback player, when a polling command for the status of the virtual music playback player is input from the at least one music-synchronized control master or the plurality of music-synchronized control slaves, to the music-synchronized control master or music-synchronized control slave that has transmitted the polling command; and transmit, upon receipt of a synchronization request command, a reference clock time at the time that the synchronization request command is input from the at least one music-synchronized control master or the plurality of music-synchronized control slaves, to the music-synchronized control master or the music-synchronized control slave that has transmitted the synchronization request command to request synchronization of the reference clock time and the individual clock time; wherein:

the status of the virtual music playback player includes at least an identifier that identifies a music content to be played back in the at least one music-synchronized control master, a most recent operation content as specified by a most recently issued operation command, an in-content playback timing of the music content associated with the operation command, and a timing in the reference clock time corresponding to the in-content playback timing;

the master control section of the at least one music-synchronized control master has a function of controlling the master music playback player by converting a timing in the reference clock time corresponding to the in-content playback timing, which is obtained from the status of the virtual music playback player, to a timing in the individual clock time corresponding to the in-content playback timing; and the slave control section of each of the plurality of music-synchronized control slaves has a function of controlling the slave music playback player or the slave music-synchronized performer or both by converting a timing in the reference clock time corresponding to the in-content playback timing, which is obtained from the status of the virtual music playback player, to a timing in the individual clock time corresponding to the in-content playback timing.

2. The music-synchronized control platform according to claim 1, wherein:
the master control section of the at least one music-synchronized control master has a function of acquiring an actual in-content playback timing at which the master music playback player is currently playing back the music content, calculating a time difference between the actual in-content playback timing and a computationally defined ideal in-content playback timing at which the master music playback player has to be playing back the music content in the individual clock time, and controlling, only when the time difference is equal to or longer than a certain time, playback of the master music playback player so as to play back at the computationally defined ideal in-content playback timing in the individual clock time to minimize the time difference.

3. The music-synchronized control platform according to claim 1, wherein:
the slave control section of each of the plurality of music-synchronized control slaves is provided with the slave music playback player, and has a function of acquiring an actual in-content playback timing at which the slave music playback player is currently playing back the music content, calculating a time difference between the actual in-content playback timing and a computationally defined ideal in-content playback timing at which the slave music playback player has to be playing back the music content in the individual clock time, and controlling, only when the time difference is equal to or longer than a certain time, playback of the slave music playback player so as to play back at the computationally defined ideal in-content playback timing in the individual clock time to minimize the time difference.

4. The music-synchronized control platform according to claim 1, wherein:
the stage has a function of issuing a secret key and an access key to the music-synchronized control master;
the at least one music-synchronized control master uses the secret key and the access key to communicate with the stage of the music-synchronized control server;
the plurality of music-synchronized control slaves use the access key, which has been issued to the at least one music-synchronized control master, in communicating with the stage of the music-synchronized control server.

5. The music-synchronized control platform according to claim 1, wherein:
the music-synchronized control server has a function of identifying the stage and the virtual music playback player with the access key upon access from the at least one music-synchronized control master or the plurality of music-synchronized control slaves.

6. The music-synchronized control platform according to claim 1, wherein:
the stage has a function of allocating an ID to each of the at least one music-synchronized control master and the plurality of music-synchronized control slaves that respectively have accessed the stage for the first time; and
the stage further has a function of managing a connection status of each of the at least one music-synchronized control master and the plurality of music-synchronized control slaves on a basis of the ID and an access timestamp.

7. The music-synchronized control platform according to claim 1, wherein:
a status of the virtual music playback player is defined as follows:
when the operation command is a playback command, a playback status is recorded as the most recent operation content, and the in-content playback timing is recorded as a playback start time; and
when the operation command is a stop command, a stop status is recorded as the most recent operation content, and the in-content playback timing is recorded as a playback stop time.

8. The music-synchronized control platform according to claim 1, wherein:
when the operation command is a seek command, a seek status when the playback is on-going or is stopped is recorded as the most recent operation content, the in-content playback timing is recorded as a timing at a seek position.

9. The music-synchronized control platform according to claim 1, wherein:
the at least one music-synchronized control master is a communication terminal including a display section provided with a display screen; and is configured to display an input interface of the master music playback player on the display screen.

10. The music-synchronized control platform according to claim 1, wherein:
the master control section of the at least one music-synchronized control master and the slave control section of each of the plurality of music-synchronized control slaves have a function of periodically transmitting the polling command to the music-synchronized control server to check the status of the virtual music playback player, and respectively controlling the master music playback player and the slave music playback player or the slave music-synchronized performer according to a change in the status of the virtual music playback player upon detection of the change in the status transmitted back from the music-synchronized control server.

11. The music-synchronized control platform according to claim 1, wherein:
the master control section of the at least one music-synchronized control master and the slave control section of each of the plurality of music-synchronized control slaves have a function of acquiring an analysis result of a musical piece corresponding to the music content whereby the analysis result includes at least one event, judging whether or not the in-content playback timings in the master music playback player and the slave music playback player become matched with the event timing of any event while the master music playback player and the slave music playback player are playing back, and accordingly executing an event process corresponding to the event having the matched event timing.

12. The music-synchronized control platform according to claim 11, wherein:
the slave music-synchronized performer of each of the plurality of music-synchronized control slaves is controlled according to the analysis result of the musical piece by executing an event process corresponding to the event.

13. The music-synchronized control platform according to claim 11, wherein:
the at least one music-synchronized control master and the plurality of music-synchronized control slaves each have a function of specifying an event process corresponding to at least one event according to the analysis result of the musical piece included in the music content.

14. The music-synchronized control platform according to claim 11, wherein:
the event is defined on a basis of a beat, a bar, a chorus section, a repeat section, or a chord included in the analysis result of the musical piece.

15. The music-synchronized control platform according to claim 1, wherein:
the at least one music-synchronized control master and the plurality of music-synchronized control slaves each record, as an offset time, a time difference between the individual clock time and the reference clock time of the music-synchronized control server as is obtained by issuing the synchronization request command; and respectively have a function of adjusting the computationally defined ideal in-content playback timings in the master music playback player and the slave music playback player if the offset time has changed more largely than a predetermined value.

16. The music-synchronized control platform according to claim 1, wherein:
the at least one music-synchronized control master is provided with a master music-synchronized performer similar to the slave music-synchronized performer.

17. A music-synchronized control platform configured to synchronize music playback or music-synchronized performance or both with music in a plurality of devices, the platform comprising:
a music-synchronized control master including a master music playback player and a master processor including an individual clock time generator that generates an individual clock time, a communication means, and a master control section for the master music playback player, and being configured to control the master music playback player so as to play back a music content chosen from a plurality of music contents;
a plurality of music-synchronized control slaves, each including a slave music playback player or a slave music-synchronized performer or both, and a slave processor including an individual clock time generator that generates an individual clock time, a communication means, and a slave control section for the slave music playback player or the slave music-synchronized performer or both, and being configured to control the slave music playback player or the slave music-synchronized performer or both; and
a music-synchronized control server including a server processor including a reference clock time generator that generates a reference clock time, and a communication means connected to the music-synchronized control master and the plurality of music-synchronized control slaves via a communication network; wherein the server processor is configured to:

create a stage and a virtual music playback player when a stage create command is input from the music-synchronized control master;
delete the virtual music playback player and the stage when a stage delete command is input from the music-synchronized control master;
update a status of the virtual music playback player when an operation command relating to playback of the music content is input from the music-synchronized control master;
respond with a status of the virtual music playback player, when a polling command for the status of the virtual music playback player is input from the music-synchronized control master or the plurality of music-synchronized control slaves, to the music-synchronized control master or music-synchronized control slave that has transmitted the polling command; and
transmit, upon receipt of a synchronization request command, a reference clock time at the time that the synchronization request command is input from the music-synchronized control master or the plurality of music-synchronized control slaves, to the music-synchronized control master or the music-synchronized control slave that has transmitted the synchronization request command to request synchronization of the reference clock time and the individual clock time; wherein:
the status of the virtual music playback player includes at least an identifier that identifies a music content to be played back in the music-synchronized control master, a most recent operation content as specified by a most recently issued operation command, an in-content playback timing of the music content associated with the operation command, and a timing in the reference clock time corresponding to the in-content playback timing; and
the slave control section of each of the plurality of music-synchronized control slaves has a function of controlling the slave music playback player or the slave music-synchronized performer or both by converting a timing in the reference clock time corresponding to the in-content playback timing, which is obtained from the status of the virtual music playback player, to a timing in the individual clock time corresponding to the in-content playback timing.

18. A method of controlling a music-synchronized control platform configured to synchronize music playback or music-synchronized performance or both with music in a plurality of devices, wherein the music-synchronized control platform comprises:
at least one music-synchronized control master including a master music playback player and a master processor including an individual clock time generator that generates an individual clock time, a communication means, and a master control section for the master music playback player, and being configured to control the master music playback player so as to play back a music content chosen from a plurality of music contents;
a plurality of music-synchronized control slaves, each including a slave music playback player or a slave music-synchronized performer or both, and a slave processor including an individual clock time generator that generates an individual clock time, a communication means, and a slave control section for the slave music playback player or the slave music-synchronized performer or both, and being configured to control the slave music playback player or the slave music-synchronized performer or both; and a music-synchronized control server including a server processor including a reference clock time generator that generates a reference clock time, and a communication means connected to the at least one music-synchronized control master and the plurality of music-synchronized control slaves via a communication network; wherein the server processor executes the steps of:

creating a stage and a virtual music playback player when a stage create command is input from the at least one music-synchronized control master;

deleting the virtual music playback player and the stage when a stage delete command is input from the at least one music-synchronized control master;

updating a status of the virtual music playback player when an operation command relating to playback of the music content is input from the at least one music-synchronized control master;

responding with a status of the virtual music playback player, when a polling command for the status of the virtual music playback player is input from the at least one music-synchronized control master or the plurality of music-synchronized control slaves, to the music-synchronized control master or music-synchronized control slave that has transmitted the polling command; and transmitting, upon receipt of a synchronization request command, a reference clock time at the time that the synchronization request command is input from the at least one music-synchronized control master or the plurality of music-synchronized control slaves, to the music-synchronized control master or the music-synchronized control slave that has transmitted the synchronization request command to request synchronization of the reference clock time and the individual clock time; wherein:

the status of the virtual music playback player includes at least an identifier that identifies a music content to be played back in the at least one music-synchronized control master, a most recent operation content as specified by a most recently issued operation command, an in-content playback timing of the music content associated with the operation command, and a timing in the reference clock time corresponding to the in-content playback timing;

the master control section of the at least one music-synchronized control master executes the step of controlling the master music playback player by converting a timing in the reference clock time corresponding to the in-content playback timing, which is obtained from the status of the virtual music playback player, to a timing in the individual clock time corresponding to the in-content playback timing; and the slave control section of each of the plurality of music-synchronized control slaves executes the step of controlling the slave music playback player or the slave music-synchronized performer or both by converting a timing in the reference clock time corresponding to the in-content playback timing, which is obtained from the status of the virtual music playback player, to a timing in the individual clock time corresponding to the in-content playback timing.

* * * * *